US012597646B2

(12) United States Patent (10) Patent No.: US 12,597,646 B2
Kumar et al. (45) Date of Patent: Apr. 7, 2026

(54) ENERGY DEVICE CONTROL SYSTEM

(71) Applicant: Transportation IP Holdings, LLC, Norwalk, CT (US)

(72) Inventors: Ajith Kuttannair Kumar, Erie, PA (US); Bret Worden, Erie, PA (US); Neil Burkell, Erie, PA (US); Taral Shah, Wattsburg, PA (US); Matthew Ferguson, Erie, PA (US)

(73) Assignee: Transportation IP Holdings, LLC, Norwalk, CT (US)

( * ) Notice: Subject to any disclaimer, the term of this patent is extended or adjusted under 35 U.S.C. 154(b) by 526 days.

(21) Appl. No.: 18/299,910

(22) Filed: Apr. 13, 2023

(65) Prior Publication Data

US 2023/0395879 A1 Dec. 7, 2023

Related U.S. Application Data

(60) Provisional application No. 63/349,405, filed on Jun. 6, 2022.

(51) Int. Cl.
| | |
|---|---|
| *H01M 10/48* | (2006.01) |
| *H01M 10/42* | (2006.01) |
| *H01M 50/204* | (2021.01) |
| *H02J 7/00* | (2006.01) |

(52) U.S. Cl.
CPC ..... *H01M 10/4257* (2013.01); *H01M 50/204* (2021.01); *H02J 7/0063* (2013.01); *H01M 2010/4271* (2013.01); *H01M 2010/4278* (2013.01)

(58) Field of Classification Search
CPC ........... H01M 10/4257; H01M 50/204; H01M 2010/4271; H01M 2010/4278; H01M 2220/20; H01M 10/425
See application file for complete search history.

(56) References Cited

U.S. PATENT DOCUMENTS

2022/0185119 A1* 6/2022 Kooijman ................. B60L 1/00

* cited by examiner

*Primary Examiner* — Muhammad S Islam
(74) *Attorney, Agent, or Firm* — K&L Gates LLP

(57) ABSTRACT

An energy device control system may include an energy source enclosure that can be coupled with external loads via first external connectors outside of the energy source enclosure. The system also may include an external control device coupled with the energy source enclosure via second external connectors such that the external control device is galvanically isolated from energy device cells inside the energy source enclosure. The external control device may communicate with internal control components of the energy source enclosure via the second external connectors to control charging and/or discharging of the device cells via the first external connectors.

20 Claims, 12 Drawing Sheets

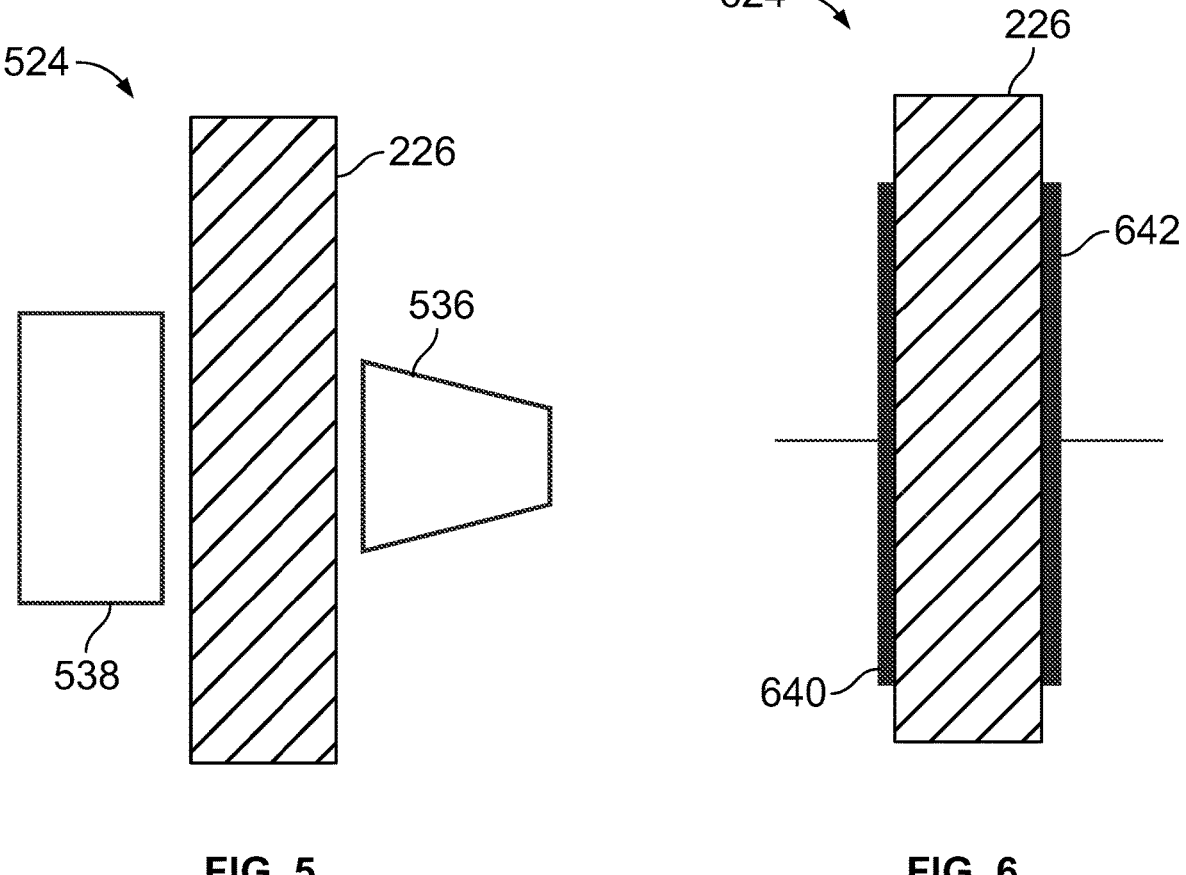
FIG. 5                        FIG. 6

| Conductively couple cells with loads | 1790 |

↓

| Couple internal control components with external control device using external, non-galvanic connection(s) | 1792 |

↓

| Control and/or monitor battery packs using the external, non-galvanic connection(s) | 1794 |

ENERGY DEVICE CONTROL SYSTEM

CROSS-REFERENCE TO RELATED APPLICATIONS

This application claims priority to U.S. Provisional Application No. 63/349,405 (filed 6 Jun. 2022), the entire disclosure of which is incorporated herein by reference.

BACKGROUND

Technical Field

The subject matter described herein relates to systems and methods that control operation of energy device systems.

Discussion of Art

Larger electrically powered systems may have high voltage equipment (e.g., powered by voltages of a thousand volts or more) supplied by several energy devices. These sources of high voltage may be distributed throughout the powered systems. The equipment may be controlled by lower voltage (e.g., less than a hundred volts) for communication and/or control of operation of the equipment. The different low and high voltage connectors can pose a risk, especially to the circuits designed for lower voltages. Further, due to the distribution of energy devices and the corresponding connectors throughout the powered system, it can be confusing as to which connectors control which energy devices to ensure that an energy source is disconnected prior to performing maintenance on the equipment. While fiber optic cables have been proposed for replacing these low voltage connectors for communication, these cables can be delicate, may require significant expense and/or additional protective equipment to use, and may not provide all of the desired functionality. It may be desirable to have an energy device control system and method that differs from those that are currently available.

BRIEF DESCRIPTION

In one example, an energy device control system is provided. This system may control operation of one or more energy storage devices. The system may include an energy source enclosure having one or more high voltage energy device cells and one or more internal control components inside the energy source enclosure. The one or more high voltage energy device cells may be coupled with one or more loads outside of the energy source enclosure via one or more first external connectors outside of the energy source enclosure. The system also may include an external control device that is external to the energy source enclosure and that may be coupled with the energy source enclosure via one or more second external connectors that are external to the energy source enclosure such that the external control device is galvanically isolated from the one or more high voltage energy device cells inside the energy source enclosure. The external control device may communicate with the one or more internal control components that are inside the energy source enclosure via the one or more second external connectors to control one or more of charging or discharging of the one or more high voltage energy device cells via the one or more first external connectors.

In another example, another energy device control system is provided. This system may include an energy device rack fixture having one or more chimney couplings and one or more external control interface devices. The one or more chimney couplings may mate with one or more chimney interfaces of one or more energy source enclosures. The one or more external control interface devices may be non-galvanically coupled with the one or more energy source enclosures by one or more first external connectors. The one or more chimney couplings may be fluidly coupled with a chimney conduit that is external to the one or more energy source enclosures to direct exhaust flowing out of the one or more energy source enclosures to the chimney conduit. The one or more external control interface devices may convey communication signals with the one or more energy source enclosures via the one or more first external connectors.

BRIEF DESCRIPTION OF THE DRAWINGS

The subject matter may be understood from reading the following description of non-limiting embodiments, with reference to the attached drawings, wherein below:

FIG. 5 illustrates another example of an external connector of the energy device control system shown in FIG. 1;

FIG. 6 illustrates another example of an external connector of the energy device control system shown in FIG. 1;

DETAILED DESCRIPTION

Embodiments of the subject matter described herein relate to energy device control systems and methods that use connectors with energy devices to promote efficient and reliable operation of the energy devices as compared to some known energy device control systems. Suitable energy devices may include batteries, capacitors, fuel cells, and the like. The energy device control systems may be used to control operation of energy devices of a powered system. The powered system may be a stationary or mobile system. With respect to mobile systems, the powered system may be a vehicle, such as an all-electric vehicle, a hybrid vehicle, or the like. A suitable vehicle may be a(n) rail vehicle, automobile, aircraft, mining vehicle, trolley or passenger vehicle (e.g., bus), marine vessel, agricultural vehicle, or the like. With respect to stationary systems, suitable powered systems may be a powered tool, backup power system, load shifting and peak shaving systems, and the like. Other stationary uses may be in support of utility grids and microgrids.

Figure 1:
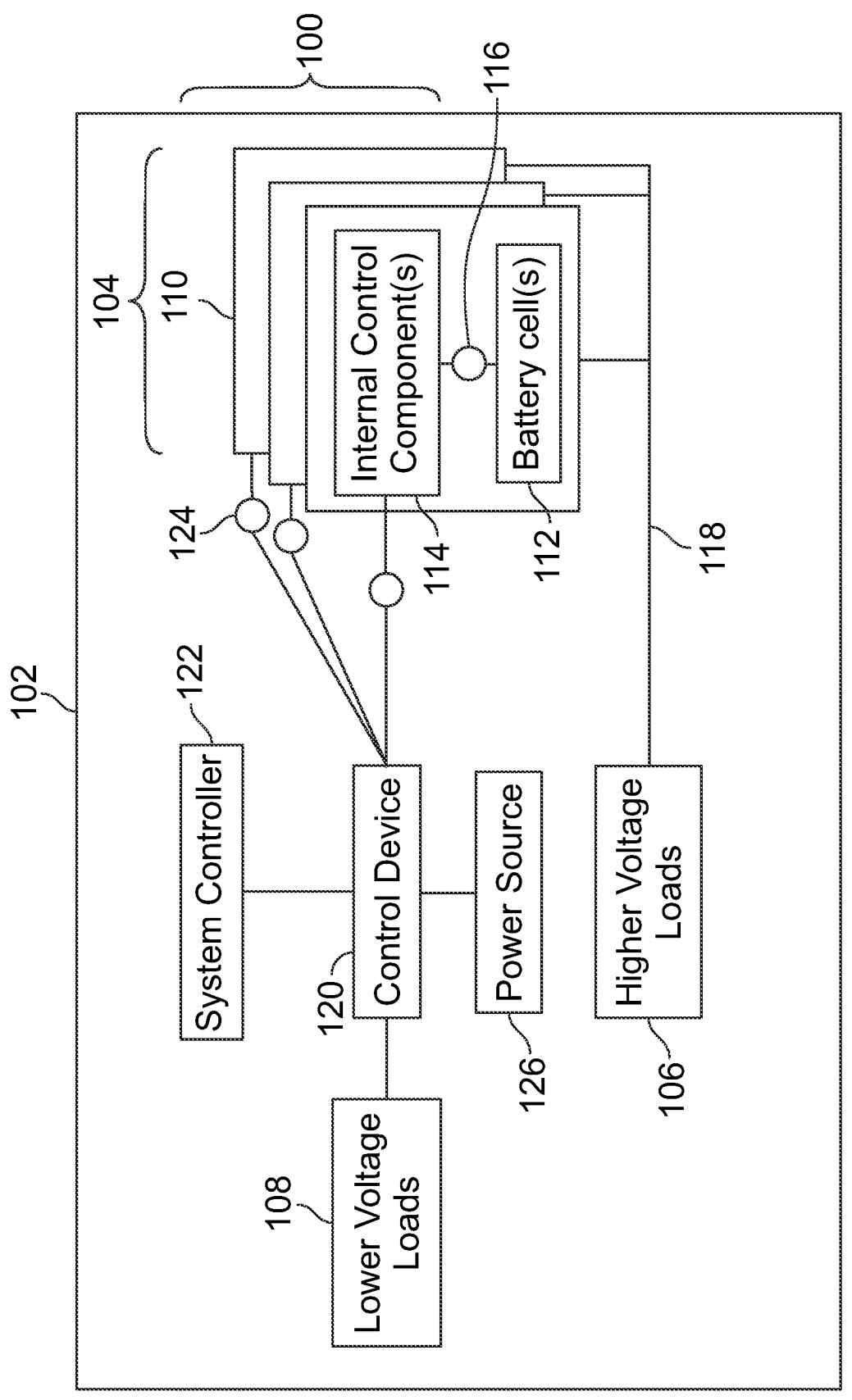
FIG. 1 illustrates one example of an energy device control system of a powered system.

FIG. 1 is a diagram that illustrates one example of an energy device control system 100 of a powered system 102. The energy device control system may be disposed inside or onboard the powered system. The powered system may be a vehicle or a stationary system, as described above. The powered system or the energy device control system may include one or more energy devices 104 that store and supply electric energy to power one or more higher voltage loads 106. Relatively lower voltage loads 108 may be energized via other power sources. While there are three packs shown in FIG. 1, the powered system or the energy device control system may include more (as needed) or fewer energy devices (down to a single). The higher voltage loads can require more electric energy (current, voltage, or both) than the lower voltage loads. Example higher voltage loads can include traction motors and auxiliary systems. Suitable auxiliary systems may include compressors, heaters, air conditioning system, blowers, and the like. Example lower voltage loads can include human machine interface (HMI) devices, lamps, communication devices, and the like. In one embodiment, the higher voltage loads can each require a thousand or more volts to operate while the lower voltage loads can each require less voltage to operate. In at least some cases, the lower voltage load may be substantially less, such as one or more orders of magnitude less.

A suitable energy device may include one or more energy source enclosures 110 as the outer housings or containers of the energy devices. These enclosures may have one or more high voltage energy device cells 112 and one or more internal control components 114 that are disposed inside the energy source enclosures. When connected, the cells may store electrical energy at relatively high electric potential or voltage, as described herein. Optionally, one or more low or lower voltage energy devices (i.e., batteries) may be included in the energy devices. The internal control components can be hardware circuitry that can control supply of current from the cells inside the containers to power one or more of the loads outside of the containers; and/or can control supply of current into the cells to charge the cells. For example, the internal control components may include one or more processors (e.g., microcontrollers, microprocessors, integrated circuits, field programmable gate arrays, etc.) that control operation of switches (e.g., contactors) to control conduction of current to and/or from the cells, which monitor desired parameters. Suitable parameters may include one or more of states of charge of the cells, voltage, current, temperature, pressures, gas detection, coolant leakage, electrolyte leakage, arcing, ozonation, smoke, vibration, freeze history, and the like. Optionally, one or more of the energy devices may not include internal control components but rather external ones. Internal control components may be powered from sources that are external to the pack or from cells (e.g., on a separate circuit) that are disposed withing the pack housing.

As illustrated, the internal control components may be connected with and powered by the energy device cells inside the same pack enclosure by one or more internal connectors 116. In the illustrated embodiment, the internal connector may be non-galvanic. In one embodiment, the internal connectors may be entirely within the enclosures of the energy devices and not extend outside of the enclosures. The cells may be coupled with the higher voltage loads outside of the energy source enclosures by, via, or through one or more external connectors 118 that are outside of (or at least extend outside of) the energy source enclosures. In one embodiment, the external connector is galvanic.

A connector may be a connector or coupling between two or more components that is formed by one or more conductive bodies (e.g., wires, cables, traces, etc.) extending from one component to another component, without any connector disposed in the connector. A connector may be a connector or coupling between two or more components that is not formed by conductive bodies extending from one component to another component, such as a wireless connector, fiber optic connector, free space optical connector, magnetic connector, a connector through or by a transformer, or the like. A suitable wireless connector may be an RF connector and/or Bluetooth enabled. A suitable magnetic connector may be an air gap magnetic connector. The internal control components inside the energy source enclosure may be galvanically isolated from the cells inside the energy source enclosures by one or more connectors.

The energy device control system may include an external control device 120 that may be located outside of or external to the energy source enclosures and communicates with components inside of the energy source enclosures. This external control device can include hardware circuitry, and that circuitry may include and/or connect with one or more processors that may coordinate communication between other controllers (e.g., a powered system controller 122), the loads, and/or internal control components inside the energy source enclosures. The powered system controller can be hardware circuitry that may include and/or is connected with one or more processors that control or dictate operation of the powered system. In one embodiment, then, the lower voltage control circuitry is protected from exposure to the higher voltage current of the energy devices/cells. The protection may take one or more forms, as described, but distance/gap and dielectric barriers/insulators may be used. In various embodiments, the control signal bridges that gap but in a way that can reduce or eliminate the risk exposure to rather delicate control circuitry from high voltage (among other things—heat/fire, corrosion, coolant or electrolyte leaks, and the like).

The external control device may be coupled with the energy source enclosures via one or more external connectors 124 and are completely external to or at least extend outside of the energy source enclosures. In one embodiment, the external control device may be physically isolated from the energy source such that a failure of the energy source may not cause a failover effect of the external control device. That is, the external connectors may galvanically isolate the external control device from the energy device cells inside the energy source enclosures. For example, the external control device may not have any conductive connector extending from the external control device to the cells. This can help protect the external control device and/or personnel working on the powered system from the electrical risks posed by the energy stored in the energy device cells. In one embodiment, a thermal event in the energy source may produce high temperature gases (which may be as high as about 500 degrees Celsius). Such temperatures may damage a control device that such gases may contact. The gases may be acidic or corrosive, and as such the gases may damage a control device upon contact. Other ways that a control device may be damaged may include by electrical arc flash, fire, conductive coolant leaks with contact to high voltage cells, explosion and severe vibration or shock. Examples of a suitable external control device may use one or more of a space/distance/gap; a noncombustible thermal barrier; a sealed compartment; grounded enclosures; and have one or more fluid drain paths.

The external control device can communicate with the internal control components inside the energy source enclosures via the external connectors. This communication can allow the external control device to control charging and/or discharging of the energy device cells via the external connectors. For example, the external control device can communicate with the internal control components to connect or disconnect one or more of the cells with the external connectors for charging or discharging of the cells via the external connectors.

The energy device control system separates (a) the connectors for communication and/or control with the energy devices from (b) the connectors for conduction of high or higher voltages from the energy devices to the loads by using external connectors with the energy devices for the former connectors (e.g., the connectors for communication and/or control) and using external connectors with the energy devices for the latter connectors (e.g., the connectors for conduction of high or higher voltages). This can be desirable for personnel maintaining, inspecting, or operating the powered system or energy devices for interacting with the energy devices via the external connectors (e.g., to disconnect the cells from the loads) without having to come into contact with the external connectors (that may be conducting high voltages).

The connectors between some devices and/or components of the powered system and/or energy device control system may include a combination of and connectors. For example, the entirety of the connector between the control device of the energy device control system and the energy source enclosures may include a combination of and connectors. The presence of the coupling in at least part of the serial connector(s) between the control device and the energy devices can provide the protection described above (even with the presence of one or more additional connectors on one or both sides of the connector), as the connector interrupts or prevents conduction of high voltage current across or through the connector.

Optionally, the control device can direct the energy devices to power one or more of the low voltage or low power loads via or through the external connectors. For example, electric energy can be transferred across the external connector via a magnetic coupling, transformer, or the like, from the energy device cells in the energy devices to the low voltage loads to at least partially or fully power the low voltage loads. In one example, the energy devices can partially or fully power the external control device by supplying voltage across or through the external connector.

The energy device cells of one or more of the energy devices may be at least partially charged or the charge of the cells may be maintained (e.g., by trickle charging the cells) using energy that is conducted to the cells via the external, connectors. For example, a power source 126 such as the external control device, the energy device monitor controller, energy device cells outside of the energy devices, or another source may convey electric energy across, through, or via an external, connector into the energy source. This energy may then be used to trickle charge the cell(s) in that energy source.

The external, connectors described and/or shown herein may take one or more forms depending on the embodiment and various end use requirements. Examples of various options for these external connectors are provided herein, but not all embodiments are limited to these examples. Moreover, in one embodiment, an external connector in the energy device control system may be provided by two or more of the examples described herein.

Figure 2:
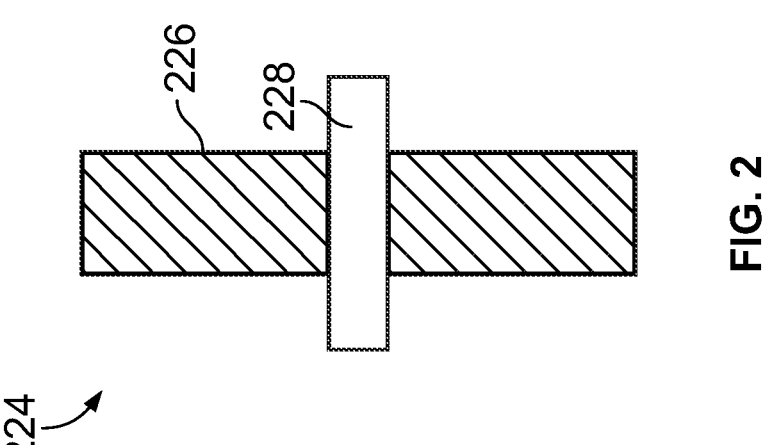
FIG. 2 illustrates one example of an external connector of the energy device control system shown in FIG. 1.

FIG. 2 is a diagram that illustrates one example of an external connector 224 of the energy device control system shown in FIG. 1. The external connector shown in FIG. 2 may represent one or more of the external connectors shown in FIG. 1. The external connector in FIG. 2 may include a dielectric body 226 and one or more fiber optic cables 228. The dielectric body is shown as a planar wall, but in other embodiments can have another shape. The dielectric body may be part of the energy source enclosure, such as part or all of an external wall of the enclosure. Alternatively, the dielectric body may be outside of (e.g., external to) the energy source enclosure. The fiber optic cable can be a non-conductive, light-transmissive body that contains and channels light signals along the length of the fiber optic cable for communication of information. The dielectric body can prevent contact with high voltage cells on one side (e.g., the right side of FIG. 2) of the dielectric body and object on the other side (e.g., the left side of FIG. 2) of the dielectric body. The fiber optic cable(s) can extend through the dielectric body from the right side to the left side of the dielectric body. The internal control components inside the energy source enclosure and the external control device can be connected with each other by this fiber optic cable. The internal control components and the external control device may communicate with each other by transmitting light to each other through, along, or via the fiber optic cables without establishing or creating a connector between the internal control components and the external control device, and without establishing or creating a connector between the energy device cells and the external control device.

The phases of suitable dielectric materials may be as liquids, solids and gases. Suitable dielectric materials may include one or more of porcelain (ceramic), mica, glass, plastics, and the oxides of various metals. A suitable metal oxide may be alumina. Other suitable dielectric material may be dry air or distilled water. Another suitable dielectric is a vacuum. Depending at least in part on the dielectric material used, a suitable housing or container may contain it and define its shape and volume—if gas or liquid. A solid dielectric may hold its own shape and volume. More than one dielectric material may be used. As used herein, the term dielectric material further includes electrically insulative materials. Suitable plastics may include one or more of polyvinyl chloride, rubber-like polymers, and polyethylene. A suitable polyethylene may be polyethylene tetrafluoroethylene (PTFE). Another suitable material may be silicone, and the like.

Figure 3:
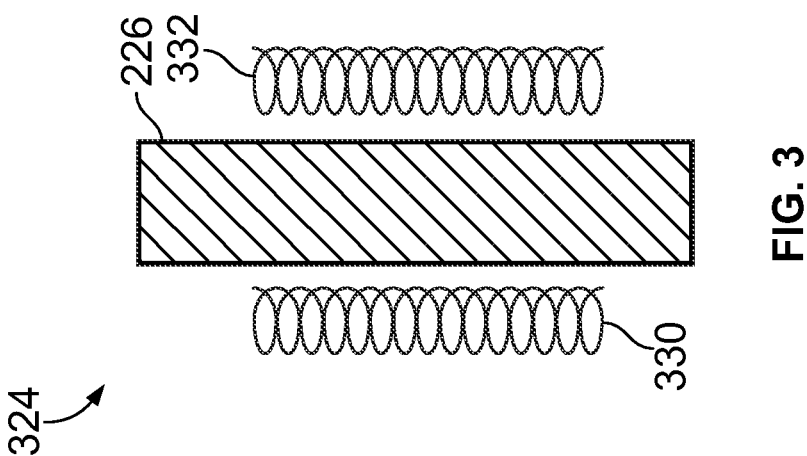
FIG. 3 illustrates another example of an external connector of the energy device control system shown in FIG. 1.

FIG. 3 is a diagram that illustrates another example of an external connector 324 of the energy device control system shown in FIG. 1. The external connector shown in FIG. 3 may represent one or more of the external connectors shown in FIG. 1. The external connector in FIG. 3 is provided by a magnetic connector that is a coupling between primary and secondary conductive coils 330, 332 on opposing sides of the dielectric body shown in FIG. 2. The primary and secondary coils may be energized to create a magnetic field between the coils. This magnetic field may be a result of the magnetic coupling or a result of the external connector. In one embodiment, one or more of the coils are separated by a grounded iron core that provides a physical, thermal, arc-resistant barrier.

The internal control components inside the energy source enclosure may be coupled with one of the coils (e.g., the secondary coil) and the external control device can be connected with another of the coils (e.g., the primary coil). The internal control components and the external control device can communicate with each other and/or transfer electric energy to each other via the magnetic coupling provided by the coils without establishing or creating a connector between the energy device cells and the external control device. The dielectric body separates the coils from each other to prevent a connector from being created between the circuit or circuitry of the external control device and the circuit or circuitry of the internal control components.

Figure 4:
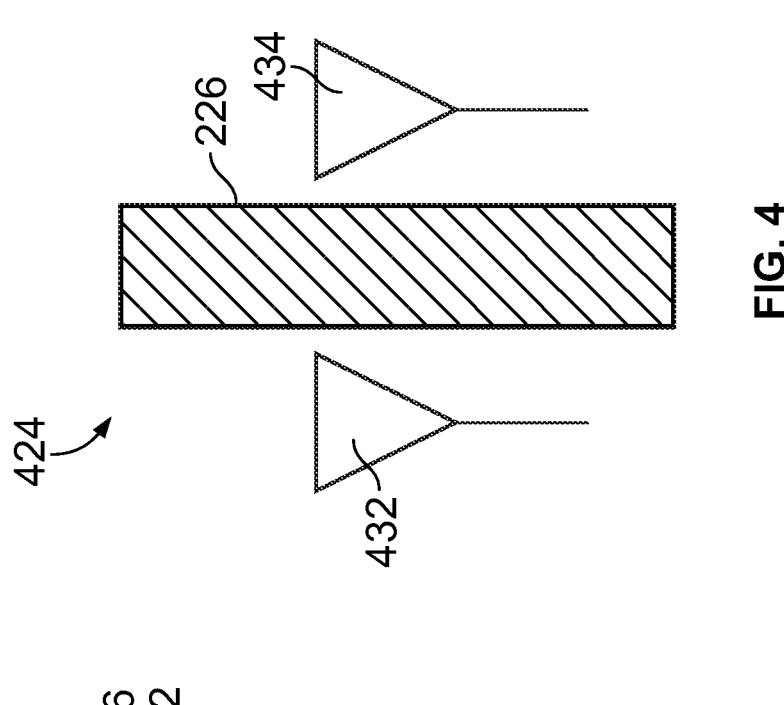
FIG. 4 illustrates another example of an external connector of the energy device control system shown in FIG. 1.

FIG. 4 is a diagram that illustrates another example of an external connector 424 of the energy device control system shown in FIG. 1. The external connector shown in FIG. 4 may represent one or more of the external connectors shown in FIG. 1. The external connector in FIG. 4 is provided by a wireless connector or coupling between antennas 432, 434 on opposing sides of the dielectric body shown in FIG. 2. One antenna may be coupled with the internal control components and the other antenna may be coupled with the external control device. The antennas can wirelessly communicate radio frequency (RF) signals between each other (and through the dielectric body) for communication and/or can transfer RF power between each other in a wireless manner.

The internal control components and the external control device can communicate with each other and/or transfer electric energy to each other via the wireless coupling provided by the antennas without establishing or creating a connector between the energy device cells and the external control device.

FIG. 5 is a diagram that illustrates another example of an external connector 524 of the energy device control system shown in FIG. 1. The external connector shown in FIG. 5 may represent one or more of the external connectors shown in FIG. 1. The external connector in FIG. 5 is provided by a free space optical connector or optical coupling between a light source 536 and a light detector 538. The light source can be a lamp, such as a light emitting diode (LED), infrared (IR) lamp, or the like, which generates light in a sequence to communicate information. The light detector can be a sensor, such as a photodetector, IR sensor, etc., that senses the light generated by the light source. The light source and the light detector can be spaced apart to prevent a conductive or connector between the light source and the light detector. In one example, the light source and the light detector are spaced apart from each other with no other body or object between the light source and the light detector. For example, the light source and the light detector may be separated from each other by free space. Optionally, the dielectric body may be between the light source and the light detector. The dielectric body may be clear or light transmissive to allow the light detected by the light source on one side of the dielectric body to be detected by the light detector on the opposite side of the dielectric body.

One of the light source or light detector may be coupled with the internal control components inside an energy source and the other of the light detector or the light source may be coupled with the external control device. The gap or space between the light source and the light detector prevents a conductive or connector between the external control device and the energy device back from existing or being created. The external control device and the internal control components can communicate via different flashes and/or colors of light. Optionally, the light detector may include or be a photovoltaic device that can convert incident light into electric energy. The energy source and the external control device can transfer electric energy between each other using the light source and the photovoltaic device without being conductively or galvanically coupled. In one example, the external control device may be connected with both a light source and a light detector and the internal control components also may be connected with both a light source and a light detector. The light source coupled with the external control device can communicate information and/or transfer energy to the light detector coupled with the internal control components. The light source coupled with the internal control components can communicate information and/or transfer energy to the light detector coupled with the external control device. These communications and/or power transfer can occur using the connector and not a connector.

FIG. 6 is a diagram that illustrates another example of an external connector 624 of the energy device control system shown in FIG. 1. The external connector shown in FIG. 6 may represent one or more of the external connectors shown in FIG. 1. The external connector in FIG. 6 is provided by a capacitive connector or capacitive coupling between conductive bodies 640, 642 and across the dielectric body. Alternatively, the dielectric body may be replaced with a gap of air or another gas. The conductive bodies may be conductive plates that are conductively (e.g., galvanically) coupled with the exterior control device and the internal control components. For example, the conductive body on one side of the dielectric body or gap may be conductively coupled with the circuit or circuitry of the external control device, while the other conductive body on the opposite side of the dielectric body or gap may be conductively coupled with the circuit or circuitry of the interior control components.

The dielectric body between the conductive bodies prevents a conductive or connector between the external control device and the energy device back from existing or being created. The external control device and the internal control components can communicate and/or transfer electric energy by energizing the conductive bodies to change the amount of energy transferred between the conductive bodies.

As described above, one or more of the external, connectors in the energy device control system may be provided by a combination of the connectors shown and/or described herein. For example, a single external, connector can be created by two or more of the connectors shown in FIGS. 2 through 6.

Figure 7:
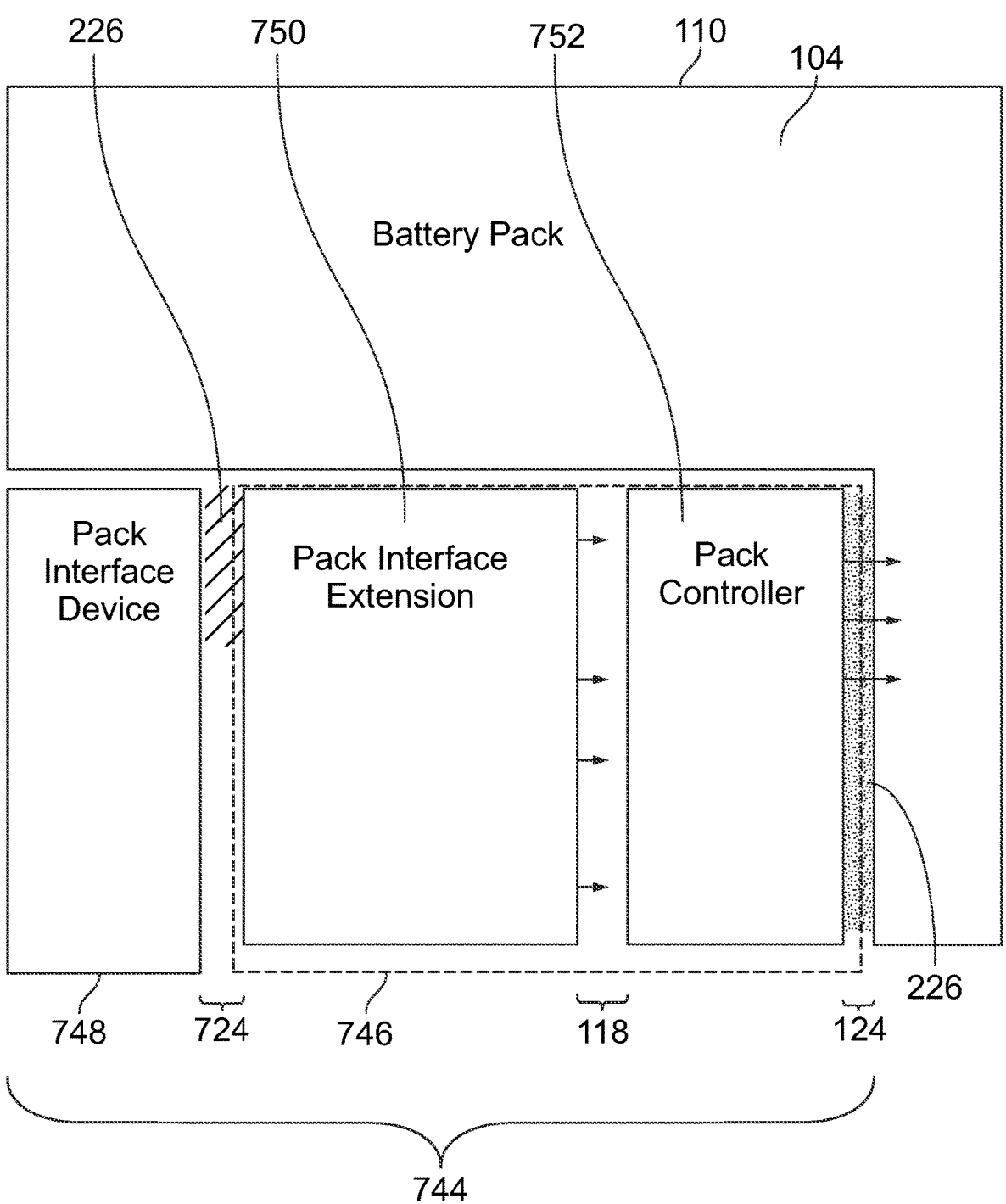
FIG. 7 illustrates one example of a pack interface assembly of the energy device control system shown in FIG. 1.

FIG. 7 is a diagram that illustrates one example of a pack interface assembly 744 of the energy device control system shown in FIG. 1. The pack interface assembly may be used to provide one or more of the external connectors of the energy device control system shown in FIG. 1. For example, the pack interface assembly may be connected with or be part of an energy source enclosure such that the external control device shown in FIG. 1 can be non-galvanically connected to several of the energy devices by several separate pack interface assemblies. Alternatively, a single pack interface assembly may provide external, connectors between the external control device and several energy devices.

The pack interface assembly may include an extension assembly 746 and a pack interface device 748. The extension assembly can be affixed to or included within the energy source enclosure of an energy source shown in FIG. 1. The extension assembly may be provided by one or more circuit boards or other devices having conductive wires, traces, or the like, and optionally one or more processors. The extension assembly may be connected with the internal control components and/or the cells of the energy source by an external, connector. The extension assembly can communicate with the internal control components (and optionally transfer low voltages or low amounts of power) across, through, or via this external, connector.

The pack interface device may be provided by one or more circuit boards or other devices having conductive wires, traces, or the like, and optionally one or more processors. The pack interface device optionally can be referred to as an external control interface device. The pack interface device may be connected with the external control device by one or more external or conductive connectors between the pack interface device and the external control device. Optionally, the pack interface device may be connected with the external control device by one or more or non-conductive connectors. The external control device may communicate with the internal control components (and optionally transfer electric energy) via the pack interface assembly and the external, connectors provided by the pack interface assembly.

As shown in FIG. 7, the extension assembly optionally can include a pack interface extension 750 and a pack controller 752. Each of the pack interface extension and the pack controller can represent one or more circuits, circuit boards, etc., that optionally can include one or more processors. The pack interface extension and the pack controller can be conductively coupled with each other by or conductive connectors. Alternatively, the pack interface extension and the pack controller can be connected with each other by non-conductive connectors, such as an additional external, connector.

The pack controller may connect with the system controller of the powered system shown in FIG. 1. For example, the pack controller can be connected with a vehicle controller that controls operation of a vehicle. The pack controller can handle (e.g., direct) communications between the system controller, the external control device, and the internal control components to the appropriate controller, device, or component. The pack interface extension provides a communication interface between the pack controller and the pack interface device. In one embodiment, the pack interface device may direct or convey electric energy into the pack interface extension from an external power source, such as an external energy source or cell, to power the pack controller through the one or more external connectors between the pack interface device and the pack interface extension.

The pack interface device may be spaced apart from the pack interface extension by an external, non-galvanic (e.g., an electrically isolating, non-conductive) connection 724. This external, non-galvanic connection may be one example of the external, non-galvanic connections 124 shown in FIG. 1. As described herein, this external, non-galvanic connection may include a dielectric body that is external to the energy source enclosure with the one or more external connectors that are outside of the energy source enclosure extending through or across the dielectric body. This dielectric body is remote from the high pack energy and is robust to any failures within the pack which would challenge, in other configurations, electrical isolation. This connection can provide seals that prevent (or contain) leaks (e.g., coolant leaks) in the pack interface extension from reaching any conductive bodies outside of the pack interface extension and/or between the pack interface extension and the pack interface device. Additionally, the seals provided by this connection can operate as a firewall that prevents thermal events (e.g., extreme or damaging heat, fire, etc.) in the pack interface extension from reaching the pack interface device. Similarly, the pack interface assembly may be spaced apart from the energy source enclosure by another dielectric body (shown as 124 in FIG. 7) that is external to and/or that is part of the energy source enclosure. This additional dielectric body also may be part of another external, connector between the energy source enclosure and the pack interface assembly.

Figure 8:
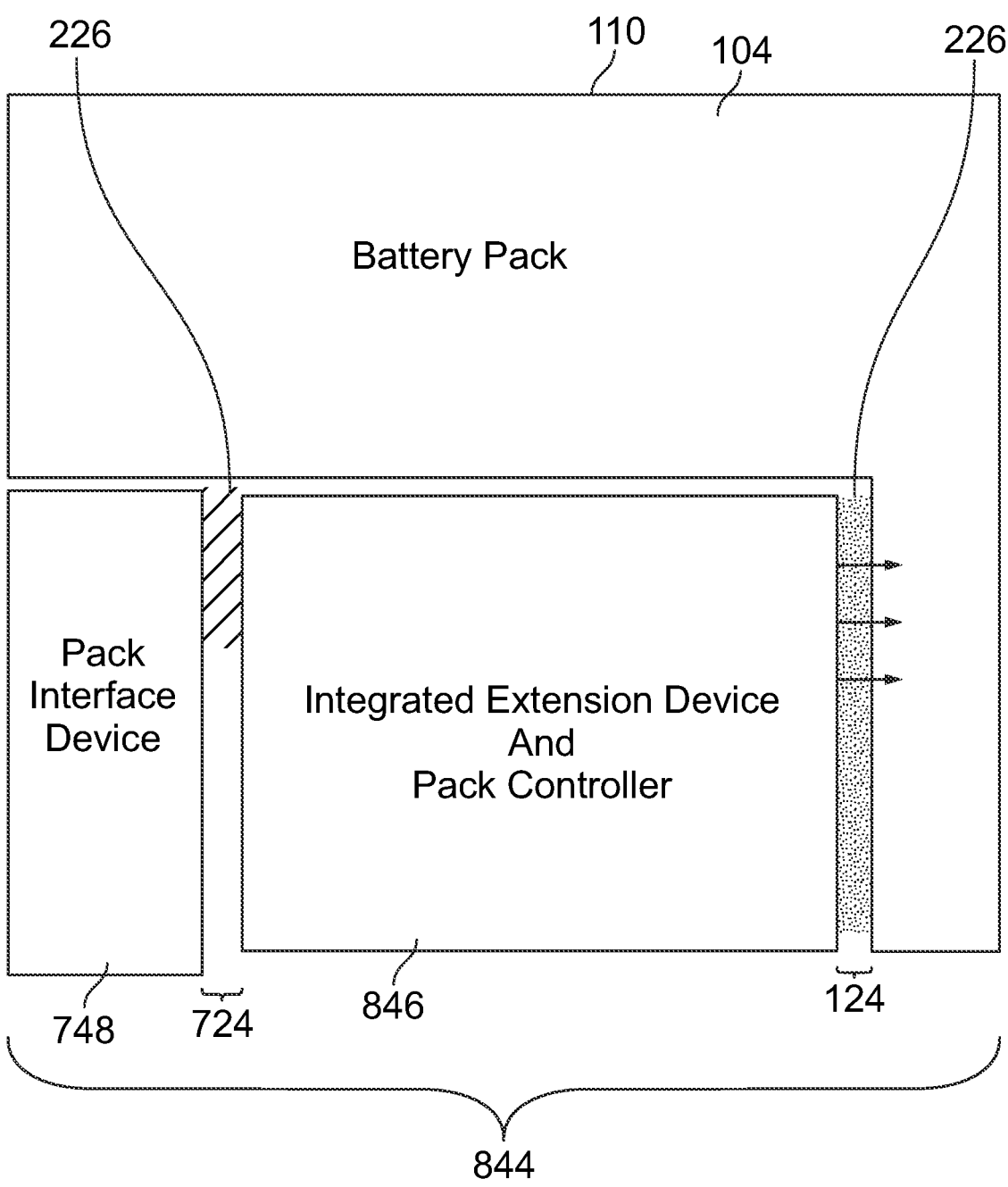
FIG. 8 illustrates another example of a pack interface assembly of the energy device control system shown in FIG. 1.

FIG. 8 is a diagram that illustrates another example of a pack interface assembly 844 of the energy device control system shown in FIG. 1. The pack interface assembly may be used in place of the pack interface assembly shown in FIG. 7 for one or more of the energy devices. In one example, the energy device control system can include one or more of the pack interface assemblies shown in FIG. 7 to non-galvanically connect the external control device with one or more energy devices and one or more of the pack interface assemblies shown in FIG. 8 to non-galvanically connect the external control device with one or more other energy devices.

One difference between the pack interface assemblies shown in FIGS. 7 and 8 is that the pack controller can be included within the extension device within the extension assembly. For example, instead of the extension device and the pack controller being separate components that are connected with each other, the extension device and the pack controller can be a single device as an integrated extension device and pack controller assembly or device 846 (as shown in FIG. 8). Dielectric bodies may be on either or both sides of the integrated extension device and pack controller assembly or device to provide the external, connectors described herein.

Figure 9:
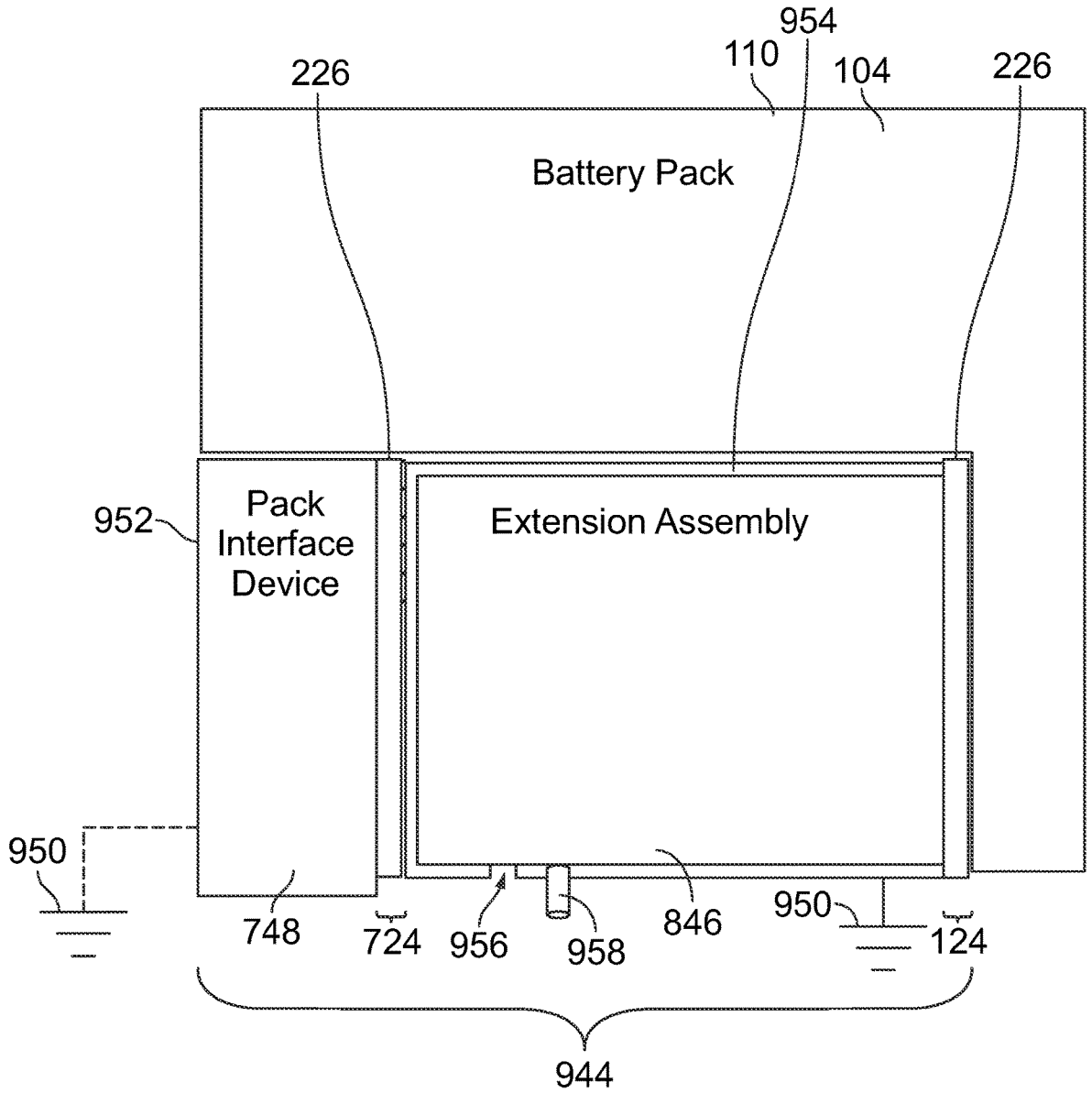
FIG. 9 illustrates another example of a pack interface assembly of the energy device control system shown in FIG. 1.

FIG. 9 is a diagram that illustrates another example of a pack interface assembly 944 of the energy device control system shown in FIG. 1. The pack interface assembly may be used in place of the pack interface assembly shown in FIGS. 7 and/or 9 for one or more of the energy devices. One difference between the pack interface assemblies shown in FIGS. 7, 8, and 9 is that the pack interface assembly shown in FIG. 9 can include protective and/or sealing dielectric bodies that contain or restrict thermal events and/or flow of liquids (such as coolant). For example, the connection 724 can include one or more dielectric bodies that form a seal between one side of the integrated extension assembly 846 and the pack interface device 748. Another connection 124 can include one or more dielectric bodies that form another seal between another side of the integrated extension assembly 846 and the energy source enclosure 110. Optionally, in an energy device control system where the pack interface extension and the pack controller are not integrated into the same assembly or device (e.g., are not within the same housing), one of the connection 724 can form a seal between the pack interface extension and the pack interface device, and another connection 124 can form another seal between the pack controller and the enclosure of the energy source. Optionally, a single dielectric body can form both or multiple ones of these seals.

The dielectric bodies of the connection 724 can provide electronic and/or mechanical seals to prevent passage of thermal events (e.g., fires) and/or mechanical events (e.g., leakage of fluids such as coolant, gases, etc.) between the components on the opposite sides of the dielectric bodies. For example, the dielectric body of the connection 724 between the pack enclosure and the integrated extension assembly 846 (or the pack controller 752) can prevent a fire inside the energy source enclosure from passing into the integrated extension assembly or the pack controller. The dielectric body of the connection 724 can be referred to as a firewall between the pack enclosure and the integrated extension assembly or the pack controller. The sealed interfaces provided by the connection 724 can prevent a thermal event within the energy source enclosure from exiting the energy source enclosure via the pack interface assembly.

One or more of the dielectric bodies of the connection 724 additionally or alternatively (e.g., optionally) can be a seal that prevents passage of fluid from the energy source enclosure into the integrated extension assembly or the pack controller. For example, fluids such as a liquid coolant, gas, or the like, may be inside the energy source enclosure. This fluid can cause undesirable electrical shorts. The dielectric body forming the fluid seal of the connection 724 can prevent passage of the fluid between the components separated by the dielectric body. The dielectric body of the connection 124 between the energy source enclosure and the integrated extension assembly 846 (or the pack controller 752) can prevent liquid coolant inside the pack enclosure (that is used to cool the interior of the pack enclosure and that may have leaked out from conduits inside the pack enclosure) from passing from the energy source enclosure into the integrated extension assembly or the pack controller. The connection 724 between the pack interface device and the integrated extension assembly 846 (or the pack interface extension 750) can provide a seal that prevents fluids from passing into the pack interface device, the integrated extension assembly, or the pack interface extension from locations between the interface between the pack interface device and the integrated extension assembly (or the pack interface extension).

One or more of the components of the energy device control system may be conductively or galvanically coupled with the same or different ground references 950 to provide electrical protection for operations on or near the components. The ground references may be the earth ground reference or a ground reference of a vehicle, such as the chassis of the vehicle. The pack interface device and the extension assembly may each have an outer housing 952, 954 that is conductive or may include conductive portions that are conductively coupled with the ground reference(s) so electric energy conducted to the outer housing(s) is conducted to the ground reference(s). This can eliminate or reduce the risk of electric shock that may occur, for example with regard to the outer housing(s). In one embodiment, thermal switch is present that can disrupt a circuit at or above a threshold temperature. A suitable thermal switch may be a PTC (Positive Temperature Coefficient) thermistor. The selectively disrupt-able circuit may be one or both of the main power feeds or the control feeds into or out of the energy source.

These outer housing(s) optionally can contain coolant within the outer housing(s). For example, the outer housing of the pack interface extension and/or the extension assembly can contain coolant within the outer housing to help cool or maintain temperatures of the pack interface extension or extension assembly within a designated range or below a designated temperature. The dielectric bodies on either side of the pack interface extension or extension assembly can seal the coolant to within the pack interface extension or the extension assembly to prevent this coolant from leaking outside of the pack interface extension or the extension assembly (and creating an increased risk of electric shock or arcing). Optionally, the pack interface device and the extension assembly may both be disposed inside the same housing.

Optionally, one or more of these outer housings may include components to control the flow of coolant in the event of a coolant leak. For example, conduits inside the housings may direct flow of the coolant inside the housings. But a leak in the conduits or interfaces between these conduits may result in the coolant flowing into undesirable volumes in the housings. To control the flow of this leaking coolant out of the housings, the housings can include drain holes 956 and/or drain conduits 958. The drain holes can be openings in the housing(s) through which coolant inside the housing(s) can drain out of the housing(s). The drain conduits can be tubes that direct draining coolant out of the housing(s). The drain hole(s) and/or drain conduit(s) can be positioned to direct the leaking coolant out of the housing to desirable locations. For example, without the drain hole(s) or drain conduits(s), the leaking coolant inside the housing(s) may flow to undesirable locations where electrical shorts may occur. With the drain hole(s) or drain conduit (s), however, flow of the coolant may be controlled or more controlled to locations that are outside of the housing (and away from locations where electric shorts may occur). For example, the leaking coolant may be directed away from conductive or connectors. One or more sensors may be provided in or near the path along which coolant flows to detect the coolant leak. These sensors can include moisture sensors that generate output upon detection of the coolant. The sensors can send signals to the external control device and/or internal control components responsive to detecting a coolant leak. The external control device and/or internal control components can then disconnect the energy storage devices (e.g., the battery cells, capacitors, etc.) from the external galvanic connections responsive to detection of the coolant leak.

The dielectric body 226 of the connection 724 between the pack interface device and the extension assembly 846 shown in FIG. 9, the integrated extension device and pack controller 846 shown in FIG. 8, or the pack interface extension 750 may operate to prevent any or all failures of the energy storage device 104, the pack controller 752, the pack interface extension 750 shown in FIG. 7, the integrated extension device and pack controller 846 shown in FIG. 8, or the extension assembly 846 shown in FIG. 9 from affecting operation of the pack interface device and the rest of the external components that are outside of the energy storage device.

Figure 10:
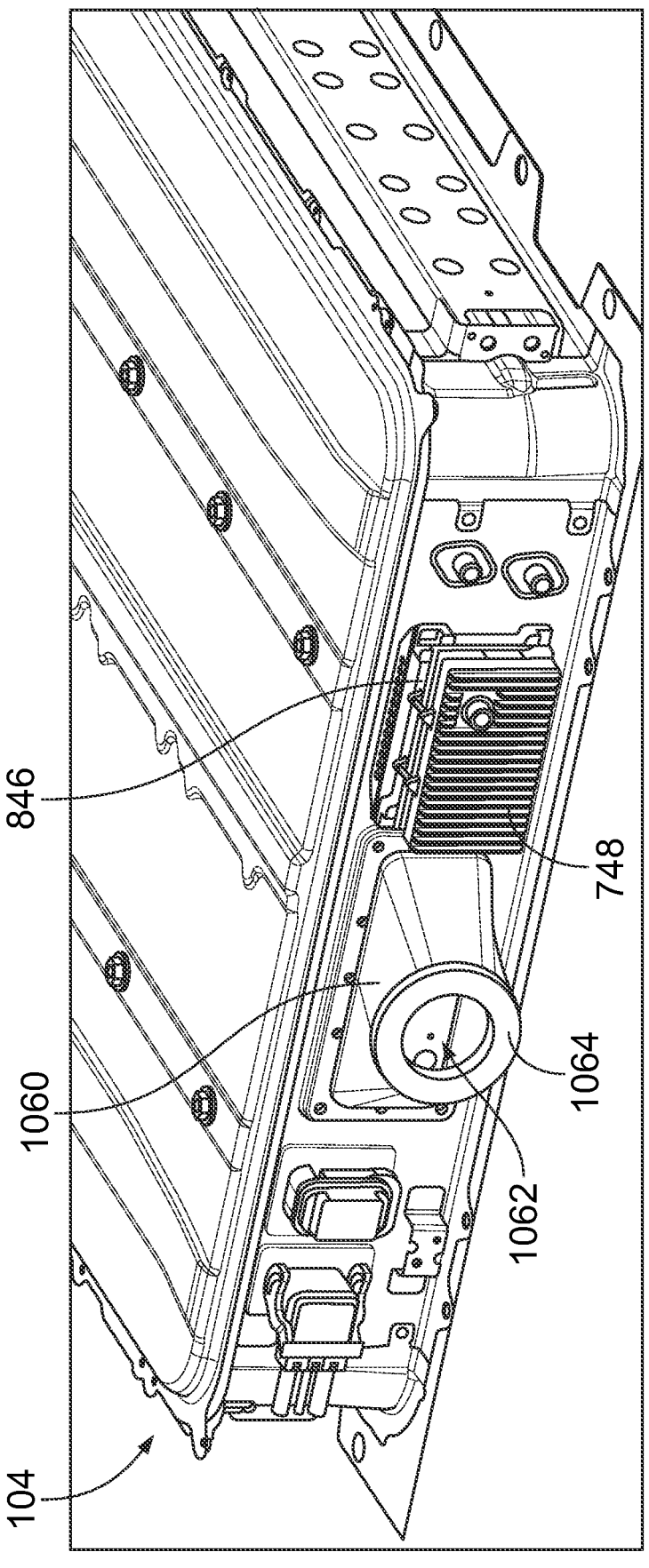
FIG. 10 illustrates a perspective view of one end of one of the energy devices shown in FIG. 1 with the pack interface device and the extension assembly shown in FIG. 9.
Figure 11:
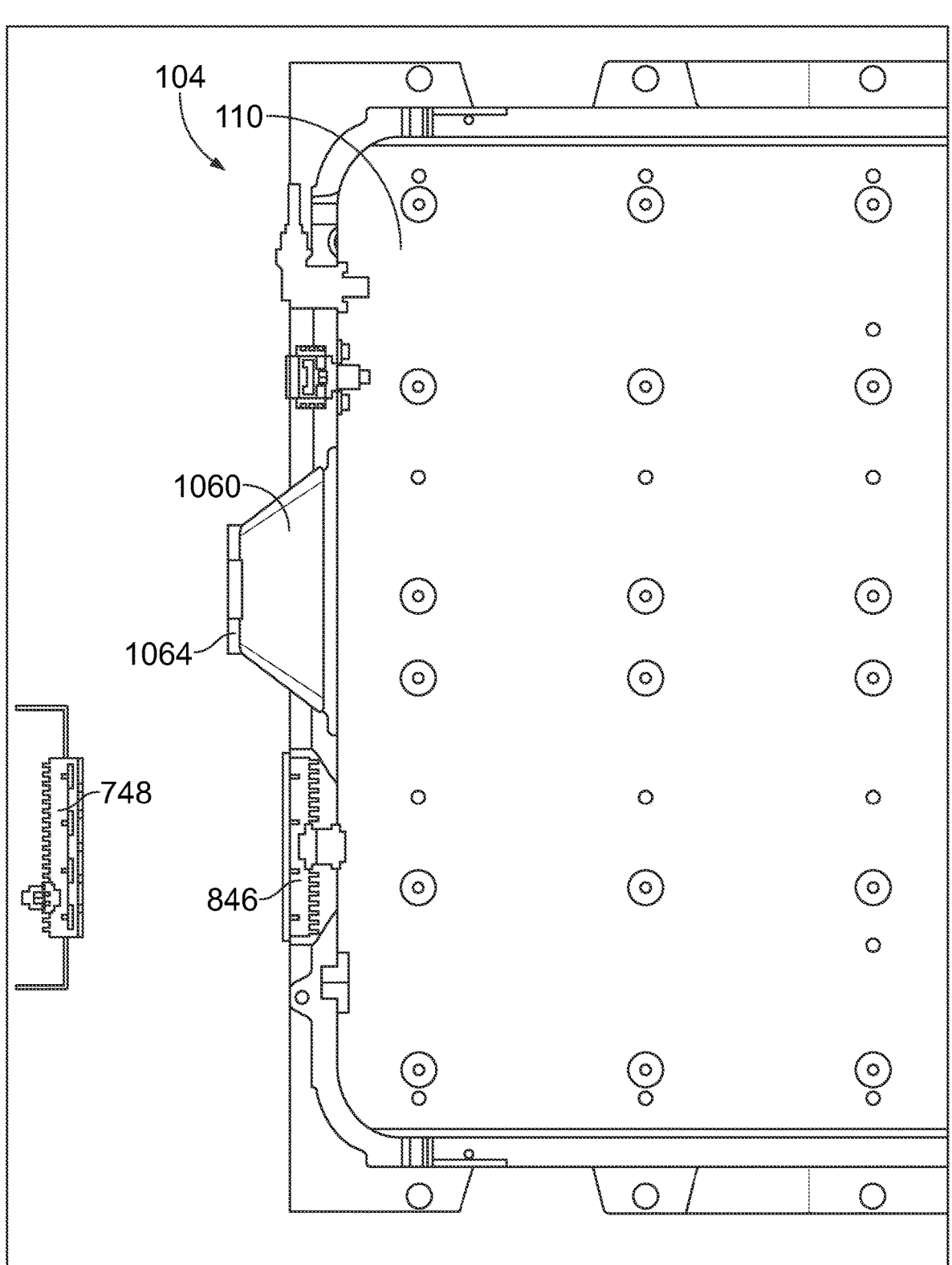
FIG. 11 illustrates a top view of the end of the energy source with the pack interface device separated from the extension assembly shown in FIG. 10.
Figure 12:
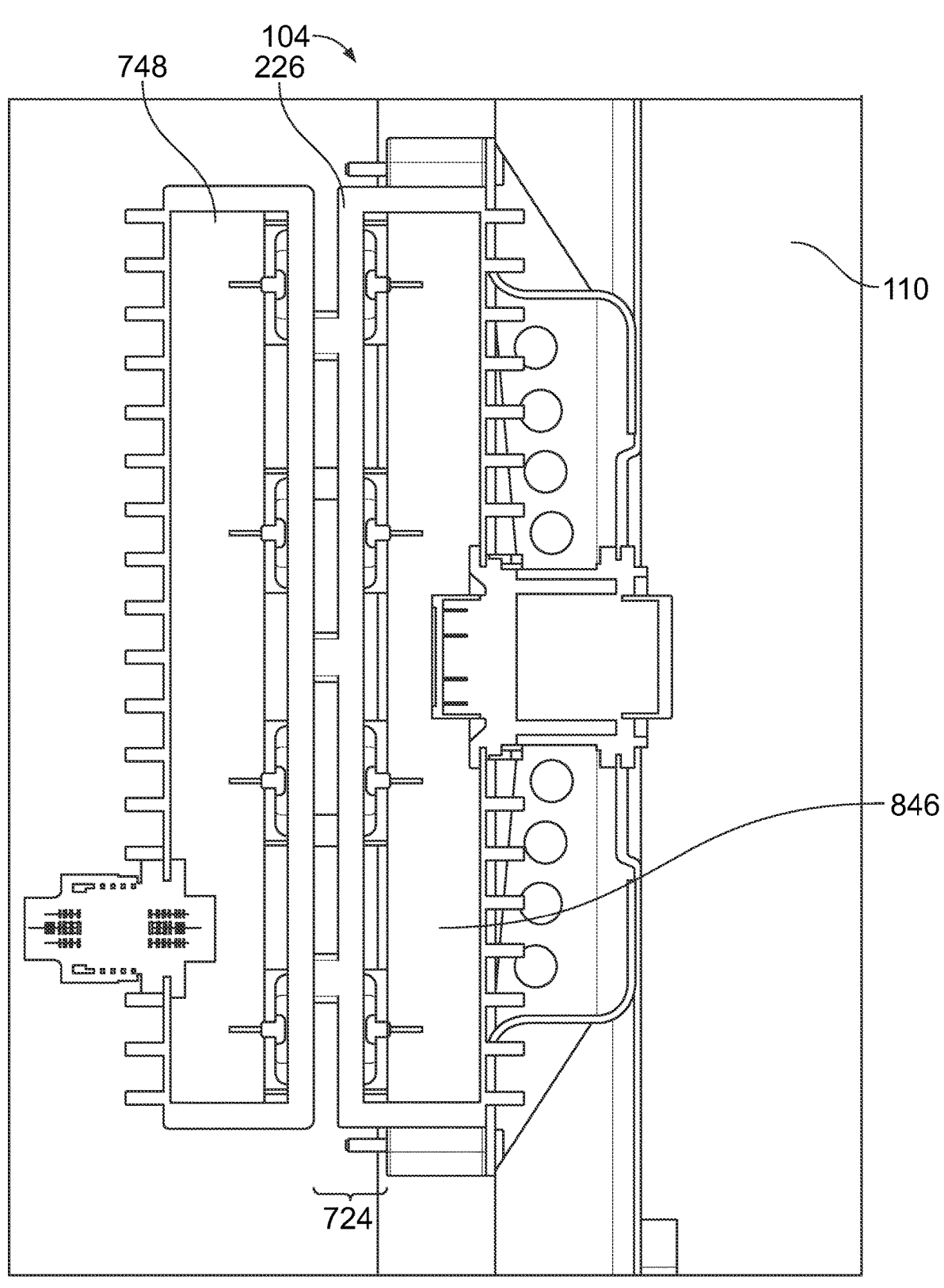
FIG. 12 illustrates the pack interface device of the energy source coupled with the extension assembly shown in FIGS. 10 and 11.

FIG. 10 is a diagram that illustrates a perspective view of one end of one of the energy devices shown in FIG. 1 with the pack interface device and the extension assembly shown in FIG. 9. FIG. 11 illustrates a top view of the end of the energy source with the pack interface device separated from the extension assembly shown in FIG. 10. FIG. 12 illustrates the pack interface device of the energy source coupled with the extension assembly shown in FIGS. 10 and 11. The pack interface device may separate or disconnect from the extension assembly while the extension assembly remains coupled with the energy source enclosure, as shown in FIG. 11. The extension assembly may remain connected or affixed to the energy source enclosure as the energy source is removed from the powered system or moved to another location in the powered system. The pack interface device may be coupled or affixed to a surface of the powered system (e.g., an interior surface of a vehicle). As described herein, the energy source having the extension assembly can be moved to a designated position in or around the powered system to create at least one of the external, connectors between the extension assembly and the pack interface device. Moving the energy source out of this designated position can cause the extension assembly to be misaligned or too far from the pack interface device, thereby preventing or destroying the external, connector that existed while the energy source (having the extension assembly) is in the designated position.

The energy source enclosure may include a chimney interface 1060 through which exhaust gases inside the energy source enclosure flow out of the energy source enclosure. The chimney interface may be or define an outlet 1062 through which the exhaust gases inside the energy source enclosure can flow out of the energy source enclosure to remove the exhaust gases from the energy source enclosure, as described below. The chimney interface can include a flexible gasket 1064 that may help form a seal with a chimney coupling (as described below).

Figures 13, 14:
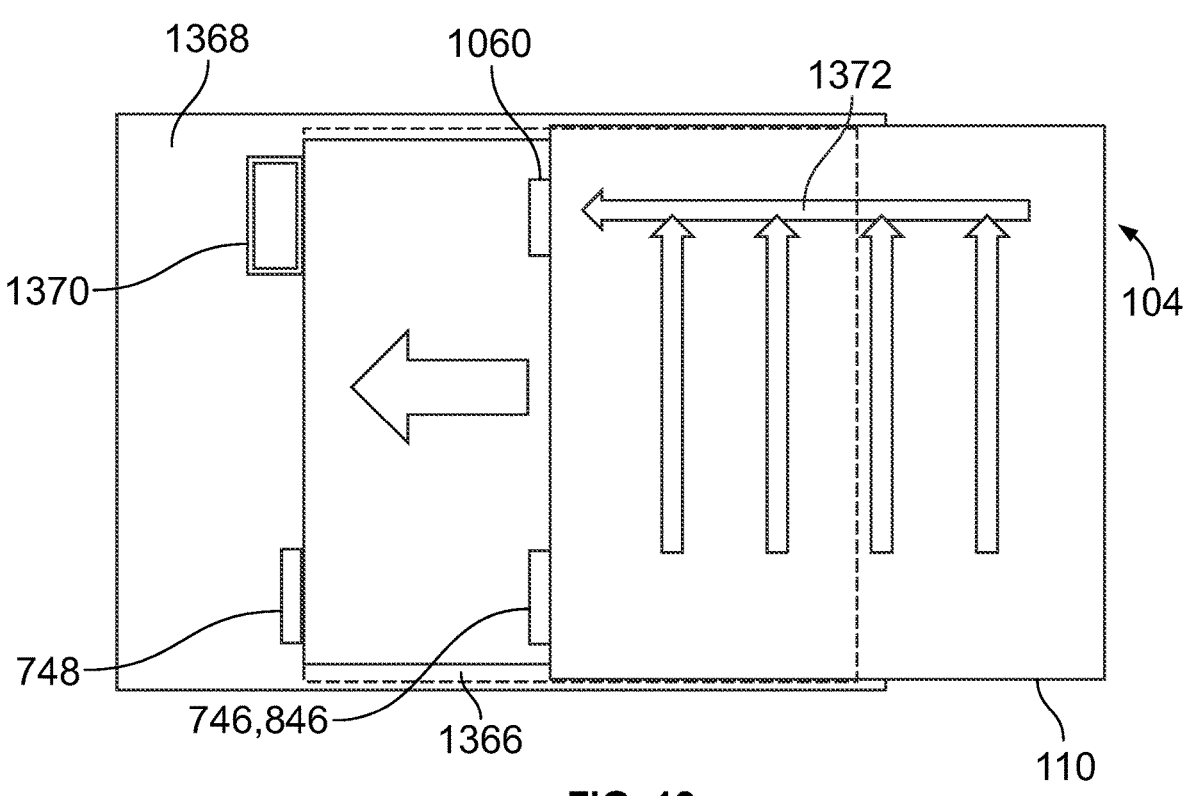
FIG. 13 illustrates a plan view of one of the energy devices shown in FIG. 1 with the energy device not in a designated position in the powered system shown in FIG. 1.
FIG. 14 illustrates another plan view the energy source in the designated position in the powered system.

FIG. 13 is a diagram that illustrates a plan view of one of the energy devices shown in FIG. 1 with the energy device not in a designated position in the powered system shown in FIG. 1 (e.g., the energy source is not in the designated position). FIG. 14 illustrates another plan view the energy source in the designated position in the powered system. The powered system may include an energy device rack fixture, rack structure, or other holding assembly 1368 (described below) that can hold one or more (or all) of the energy devices in respective designated positions. Each energy source may be moved into or out of the designated position for that energy source separately from the movement of one or more (or all) other energy devices.

While an energy source is in the designated position within the powered system, the external connector between the energy source and the external control device is established, created, or maintained. Before the energy source is in the designated position or after the energy source is moved out of the designated position, the external connector between the energy source and the external control device may not exist, or may be eliminated or prevented. Moving this energy source back into the designated position may re-establish the external connector between the energy source and the external control device.

A feature of the energy device control system may provide for reducing or preventing the chance of an energy source discharging energy (e.g., high voltages) to high voltage loads (and/or other loads) while the external connector between the external control device and the energy source does not exist, is malfunctioning, or is not provided. For example, the internal control components of the energy source may not close the switches (e.g., contactors) that conductively or galvanically couple the internal energy device cells with the loads until a command is received from the external control device. As a result, the energy device cells may remain disconnected from the loads (due to there being no connector between the cells and the loads) unless or until the external connector between the external control device and the energy source is established or re-established (at which point the external control device can direct the internal control components to connect or re-connect the internal energy device cells to the external connectors via the internal switches of the energy source).

As shown in FIG. 13, the energy source is moving toward, but is not yet reached, a designated position 1366 within the energy device rack fixture of or in the powered system. The energy device rack fixture may represent one or more (or several) shelves or other supporting structures that hold the energy source(s) in place. The energy device rack fixture may include, or may be positioned near (e.g., within close enough distance to allow coupling of the energy source) the pack interface device and a chimney coupling 1370 (described below). The pack interface device may be stationary within (or relative to) the powered system and the energy device rack fixture that holds the energy source(s). For example, the pack interface(s) for establishing the external, connectors shown in FIG. 1 may be affixed to the energy device rack fixture, a wall, or other surface within the powered system in position(s) that create the external, connector(s) once the energy source(s) are placed into the designated position(s).

In FIG. 13, the extension assembly 746, 846 of the energy source is too far from the pack interface device to create the external, connector. For example, the pack interface device may include a first segment of the fiber optic cable shown in FIG. 2 and the extension assembly of the energy source may include a second segment of the fiber optic cable shown in FIG. 2. In the position shown in FIG. 13, the first segment of the fiber optic cable may be too far from the second segment of the fiber optic cable to establish a fiber optic connector between the pack interface device and the extension assembly. As a result, no external, connector between the pack interface device and the extension assembly is created via the fiber optic cable segments.

As another example, the pack interface device may include the conductive coil 330 shown in FIG. 3 and the extension assembly of the energy source may include the other conductive coil 332 shown in FIG. 3. In the position shown in FIG. 13, these coils may be too far from each other to establish a magnetic coupling between the coils and between the pack interface device and the extension assembly. As a result, no external, connector between the pack interface device and the extension assembly is created via the conductive coils.

In another example, the pack interface device may include the antenna 432 shown in FIG. 4 and the extension assembly of the energy source may include the other antenna 434 shown in FIG. 3. In the position shown in FIG. 13, these coils may be too far from each other to wirelessly communicate signals between the antennas and between the pack interface device and the extension assembly. As a result, no external, connector between the pack interface device and the extension assembly is created via the antennas.

As another example, the pack interface device may include the light source 536 or the light detector 538 and the extension assembly of the energy source may include the other of the light detector or the light source. In the position shown in FIG. 13, the light detector may be too far from the light source to detect the light emitted by the light source. As a result, no external, connector between the pack interface device and the extension assembly is created via the light source and the light detector.

In another example, the pack interface device may include one of the conductive bodies 640, 642 and the extension assembly of the energy source may include the other of the conductive bodies 642, 640. In the position shown in FIG. 13, the conductive bodies may be too far apart to create a capacitive coupling (e.g., too far to form a capacitor that stores or conveys energy between the conductive bodies). As a result, no external, connector between the pack interface device and the extension assembly is created via the conductive bodies.

But, once the energy source is placed in the designated position shown in FIG. 14, the extension assembly 746, 846 of the energy source is sufficiently close to the pack interface device that the external, connector is created or re-established. For example, the segments of the fiber optic cable may be close enough to transmit light along the length of the fiber optic cable from the external control device to the internal control components through or via the fiber optic cable segments (and thereby establish the external, connector). As another example, the conductive coils 332, 334 may be close enough to establish the magnetic coupling between the coils and between the pack interface device and the extension assembly. In another example, the antennas 432, 434 may be sufficiently close to communicate wireless signals between the pack interface device and the extension assembly to establish the external, connector between the pack interface device and the extension assembly is created via the conductive coils.

The energy source may include internal conduits 1372 that direct the flow of exhaust gas within and out of the energy source enclosure. These internal conduits may be fluidly coupled with the chimney interface so that the exhaust gases flowing within the energy source enclosure are directed out of the energy source enclosure via or through the outlet of the chimney interface. While the energy source is shown as including a single chimney interface, the energy source optionally may include multiple chimney interfaces. As shown in FIG. 13, the chimney interface of the energy source is not mated with the chimney coupling of the powered system while the energy source is not in the designated position shown in FIG. 14. As a result, the external, connector between the external control device and the energy source does not exist and there is no fluid coupling between the chimney interface and the chimney coupling while the energy source is outside of the designated position.

But moving the energy source into the designated position may both establish the external, connector and mate the chimney interface with the chimney coupling such that the internal conduits are fluidly coupled with the chimney coupling. This can allow for the external control device to control charging (or discharging) of the energy device cells to the loads and for the exhaust gases inside the energy source enclosure to flow out of the energy source enclosure and into the chimney coupling. The chimney coupling may, in turn, be fluidly coupled with one or more exhaust conduits of the powered system that direct the exhaust gases from inside the energy source enclosure to one or more locations away from the energy source (and optionally outside of the powered system).

The pack interface device and the extension assembly may have a first alignment tolerance, and the chimney interface and the chimney coupling may have a second alignment tolerance. The first alignment tolerance may be a range of space or misalignment between the pack interface device and the extension assembly in which the external, connector is established or maintained. The external, connector may exist while the extension assembly is located within the first alignment tolerance from the pack interface device (e.g., where the range can be in one or more, or all, of vertical directions, lateral directions, depth directions toward or away from the pack interface device, etc.). The vertical directions may extend into and out of the plane of FIGS. 13 and 14, the lateral directions may extend up and down in the plane of FIGS. 13 and 14, and the depth directions may extend toward and away from the pack interface device and the chimney coupling (e.g., left and right in the plane of FIGS. 13 and 14). The external, connector may not exist while the extension assembly is located outside of the first alignment tolerance from the pack interface device.

The second alignment tolerance may be a range of space or misalignment between the chimney interface and the chimney coupling in which the chimney interface and the chimney coupling are fluidly coupled with each other (e.g., mated with each other). The chimney interface and the chimney coupling may be mated and/or may be fluidly coupled while the chimney interface is located within the second alignment tolerance from the chimney coupling (e.g., where the range can be in one or more, or all, of vertical, lateral, depth directions toward or away from the chimney coupling, etc.). The fluid coupling between the chimney interface and the chimney coupling may not exist while the chimney interface is located outside of the second alignment tolerance from the chimney coupling.

In one example, the second alignment tolerance may be greater (e.g., longer) than the first alignment tolerance. This can allow for the chimney interface and the chimney coupling to be fluidly coupled and/or mated with each other before or while the external, connector is established. This feature may help to ensure that the exhaust gases inside the energy source have a fluid pathway to be exhausted from the energy source enclosure prior to the external, connector being established. For example, the chimney interface and the chimney coupling may be fluidly coupled with each other (e.g., mechanically mated or contacting each other) before the external, connector is established or created (as the energy source is moved toward or into the designated position).

Figure 15:
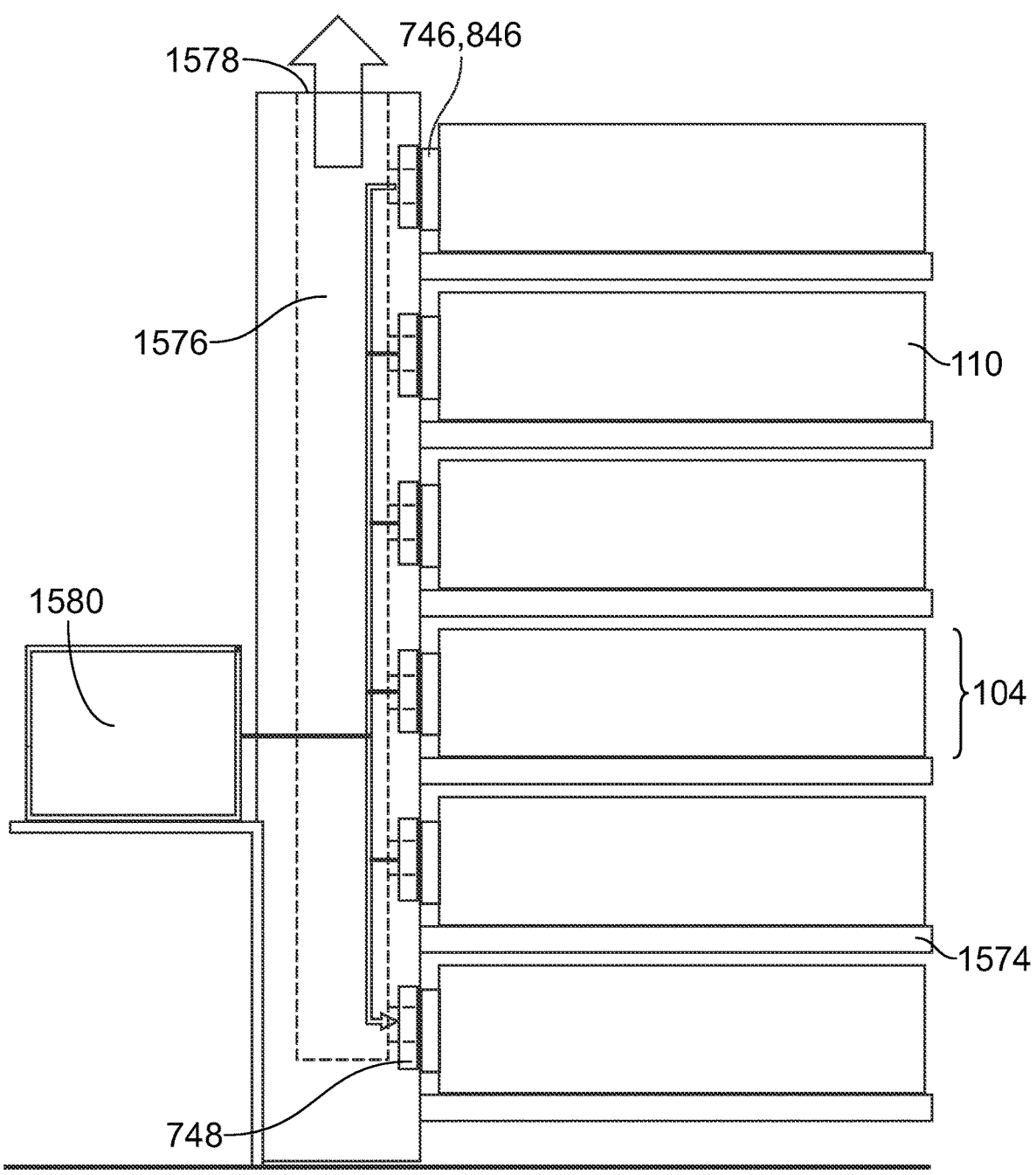
FIG. 15 illustrates an elevational view of the energy device rack fixture shown in FIGS. 13 and 14 with several of the energy devices in the energy device rack fixture.

FIG. 15 is a diagram that illustrates an elevational view of the energy device rack fixture shown in FIGS. 13 and 14 with several of the energy devices in the energy device rack fixture. The energy device rack fixture may be disposed in or may be part of the powered system and include several supporting structures 1574 that hold or support the energy devices. The supporting structures may be shelves, rods, or the like, which support the weight of the energy devices and may hold the energy devices in the designated positions described above. The energy devices shown in FIG. 15 are in the designated positions such that there are external, connectors between the pack interface devices of the energy device control system (inside the powered system, such as coupled to an interior wall of the rack structure or powered system) and the extension assemblies of the energy devices. Additionally, the chimney interfaces (not visible in the perspective of FIG. 15) are fluidly coupled with the chimney couplings of the rack structure or energy device control system (also not visible in the perspective of FIG. 5) due to the energy devices being in the designated positions.

A chimney conduit 1576 may extend through the powered system or energy device rack fixture and be fluidly coupled with the chimney couplings of the energy device rack fixture. This chimney conduit may receive the exhaust gases exiting the energy devices through the coupling of the chimney interfaces and the chimney couplings. The chimney conduit may include an outlet 1578 through which these exhaust gases exit the powered system. This can assist with directing and controlling flow of the exhaust gases out of the energy devices and out of the powered system. As described above, the pack interface devices (or external control interface devices) may be positioned in the energy device rack fixture such that the external connectors are not made with the energy devices while the chimney couplings of the energy devices are not fluidly coupled with the chimney interfaces of the energy source enclosures.

The pack interface devices (or external control interface devices) in the energy device rack fixture may be communicatively coupled with an energy device monitor controller 1580. The energy device monitor controller can represent hardware circuitry that may include and/or is connected with one or more processors. In one embodiment, the energy device monitor controller can represent or may include the external control device shown in FIG. 1. Alternatively, the energy device monitor controller may be a separate device than the external control device but may communicate with the external control device.

The energy device monitor controller can be communicatively coupled with the external control interface devices (e.g., the pack interface devices) by one or more (or connectors). For example, one or more wires, cables, conductive traces, or the like, may extend between and couple the external control interface devices with the energy device monitor controller for communication of signals. As another example, one or more wireless connectors may be used for communication between the external control interface devices and the energy device monitor controller.

The energy device monitor controller can communicate with the external control interface devices to control operation of the energy devices and/or to monitor one or more characteristics of the energy devices or energy source enclosures via the external, connectors between the external control interface devices and the extension assemblies of the energy devices. These characteristics can include states of charge (SOC) of the energy device cells in the energy devices, temperatures of the energy devices, temperatures and/or flow rates of the exhaust gases in the energy devices (or flowing out of the energy devices), rates of charging or discharging of the energy device cells, etc. These characteristics can be monitored to track inventories of the energy devices, states of health of the energy devices, etc. The energy devices and/or the external control interface devices may include one or more sensors for measuring and communicating values of these one or more characteristics to the energy device monitor controller.

The energy device monitor controller can automate decisions or assist with manual decisions regarding the energy devices based on the values of the one or more characteristics that are monitored. For example, the energy device monitor controller can track an inventory of the energy devices and can select at least one of the energy devices for placement in the powered system (e.g., onboard a vehicle). The energy device monitor controller can receive or calculate an estimated or calculated electrical demand of the powered system, such as an estimated or calculated electrical demand of the loads of the vehicle for an upcoming trip. Based on this demand and the characteristics of the energy devices, the energy device monitor controller can select or recommend at least one of the energy devices to be onboard the vehicle to ensure that the vehicle has sufficient energy to complete the trip.

Figures 16, 17:
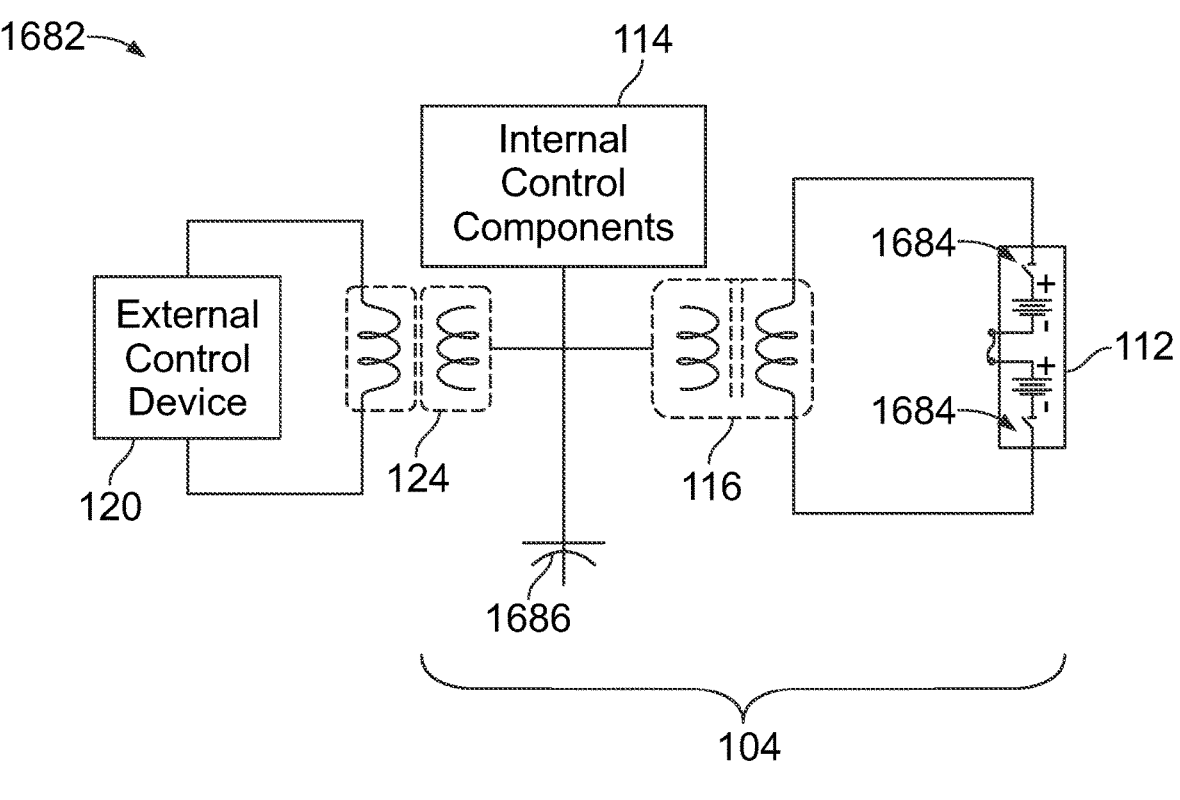
FIG. 16 illustrates one example of a circuit inside at least one of the energy devices shown in FIG. 1.
FIG. 17 illustrates a flowchart of one example of a method for powering loads of a powered system.

FIG. 16 is a diagram that illustrates one example of a circuit 1682 inside at least one of the energy devices shown in FIG. 1. The circuit may include one or more of the energy device cells of the energy source, switches 1684 (e.g., contactors) that open or close to connect or disconnect the cells from the circuit, the internal connector, the internal control components of the energy source, and an energy storage device 1686. The circuit may be coupled with the external control device by the external, connector as described above. The energy storage device can be an internal control capacitive device, such as an internal control capacitor, another energy device cell, or the like, which can store and discharge electric energy.

The internal control capacitive device may be an internal component of the energy source that stores less energy than the energy device cell or energy device cells in the pack, but that stores enough energy to power the internal control components of the energy source. For example, the internal control capacitive device may store enough energy to power the internal control components to close the switches and connect the energy device cells to the circuit to power the higher voltage loads, but not enough energy for the internal control capacitive device itself to power the higher voltage loads.

In one embodiment, the circuit may provide control power for battery pack internal control components for both external or internal (cell) sources. The external control power source can be relatively low power, but that can charge the internal capacitor over time. Once adequate internal capacitor voltage has been built up the internal control circuit may be enabled. The enabled circuit may activate the internal power converter to maintain the capacitor voltage. This embodiment may allow a pack to use an external, low power, galvanically isolated "Boot Strap" signal to trigger the internal pack converter to supply any desired control. In this configuration the high-power control required for normal operation can be directly taken from the pack and the external power supply can be relatively small as it only needs to provide enough power and energy to close one or more contactors. For example, a very small power supplied for a period of time (example 10 seconds) could be stored in a capacitor and be used to close the contactor. Once the contactors close the external power is not needed. Thus, the wireless power transmission component sizes could be significantly reduced.

In contrast to some energy devices that may power the internal control components using energy stored in the energy device cells, the circuit of the energy source shown in FIG. 16 may receive electric energy via, through, or across the external connector to charge the internal control capacitive device. For example, the additional power source 126 may supply electric energy that is received into the circuit across the external, connector. This energy can charge the internal control capacitive device with enough energy to power the internal control components to close the internal switches and galvanically couple the internal cells to the higher voltage loads via the external connectors. This can avoid depleting the energy stored in the cells of the energy source to power the internal control components.

FIG. 17 is a flowchart of one example of a method 1788 for powering loads of a powered system. This method may be performed by one or more examples of the energy device control system described herein. At step 1790, energy device cells of one or more energy devices are conductively or galvanically coupled with high voltage loads. At step 1792, the energy devices are non-conductively or non-galvanically coupled with the external control device by one or more external, connectors. At step 1794, the energy devices are controlled and/or monitored by communication of signals from the external control device to internal control components of the energy devices via, through, or across the external, connectors. This can allow for control the energy devices to disconnect the cells from the high voltage loads using the external control device and the external, connectors to avoid or reduce the risk of electric discharge by contacting the external connectors between the cells and the loads.

Suitable energy devices may include batteries, fuel cells, capacitors and the like as mentioned herein. Suitable types of batteries may include flow batteries, lithium-based batteries, sodium-based batteries, nickel-containing batteries, and carbon-containing batteries, and the like. Suitable fuel cells may include hydrogen fuel cells, proton exchange membrane and/or polymer electrolyte membrane (PEM) fuel cells, methanol fuel cells, alkaline fuel cells, phosphoric acid fuel cells, carbonate fuel cells, solid oxide fuel cells, and reversible fuel cells, and the like. Suitable capacitors may include supercaps (e.g., supercapacitors), ultracaps (e.g., ultracapacitors), and the like. In at least one embodiment, the energy source may include energy devices of plural types.

In one example, an energy device control system is provided. This system may control operation of one or more energy storage devices. The system may include an energy source enclosure having one or more high voltage energy device cells and one or more internal control components inside the energy source enclosure. The one or more high voltage energy device cells may be coupled with one or more loads outside of the energy source enclosure via one or more first external connectors outside of the energy source enclosure. The system also may include an external control device that is external to the energy source enclosure and that may be coupled with the energy source enclosure via one or more second external connectors that are external to the energy source enclosure such that the external control device is galvanically isolated from the one or more high voltage energy device cells inside the energy source enclosure. The external control device may communicate with the one or more internal control components that are inside the energy source enclosure via the one or more second external connectors to control one or more of charging or discharging of the one or more high voltage energy device cells via the one or more first external connectors.

The one or more internal control components inside the energy source enclosure may be galvanically isolated from the one or more high voltage energy device cells inside the energy source enclosure. The one or more loads may be high voltage loads. The one or more high voltage energy device cells inside the energy source enclosure may be connected with one or more low voltage loads that are outside of the energy source enclosure by the one or more second external connectors. The one or more low voltage loads may include the external control device. The external control device may be powered by the one or more high voltage energy device cells via the one or more second external connectors.

The one or more second external connectors may include a fiber optic cable extending through a dielectric body. Optionally, the one or more second external connectors may include a magnetic coupling created by primary and secondary conductive coils separated by a dielectric body. As another example, the one or more second external connectors may include an RF coupling created by transceiver antennas separated by a dielectric body. Optionally, the one or more second external connectors may include a free space optic coupling created by one or more light sources and one or more light detectors. As another example, one or more second external connectors may include a capacitive coupling created by a capacitive element disposed between and separating conductive circuits. In one embodiment, the one or more second external connectors include multiple second external connectors that are different from each other. For example, the second external connectors may include two or more of the following, with at least one second external connector being a different type of connector that at least one other second external connector: RF coupling, magnetic coupling, optical coupling, wireless coupling, a capacitive coupling, etc.

The system also may include a pack interface assembly having a pack interface extension and a pack interface device. The pack interface extension may be affixed to or included within the energy source enclosure and may be connected with the internal control components and/or the one or more high voltage energy device cells that are inside the energy source enclosure. The pack interface device may be coupled with the pack interface extension by the one or more second external connectors. The pack interface extension may include a vehicle integration control module pack controller that can communicate with a vehicle controller.

The pack interface device may direct electric energy into the pack interface extension to power the vehicle integration control module pack controller through the one or more second external connectors between the pack interface device and the pack interface extension. The pack interface device may be spaced apart from the pack interface extension by a dielectric body that is external to the energy source enclosure with the one or more second external connectors that are outside of the energy source enclosure extending through or across the dielectric body. The pack interface device may be affixed to an interior surface inside a vehicle and the energy source enclosure may be positioned proximate to the interior surface of the vehicle with the pack interface extension non-galvanically coupled with the pack interface device by the one or more second external connectors.

The pack interface device and the pack interface extension may be connected with each other while the energy source enclosure is placed into a designated position within the vehicle. The pack interface device and the pack interface extension are not aligned such that the one or more second external connectors may not be made due to misalignment between the pack interface device and the pack interface extension. The external control device may be prevented from controlling operation of the high voltage energy device cells while the energy source enclosure is not in the designated position within the vehicle. The energy source enclosure may include one or more chimney interfaces that can be fluidly coupled with one or more chimney couplings inside the vehicle while the energy device back enclosure is in the designated position inside the vehicle.

The one or more chimney interfaces may be positioned to direct exhaust gas from inside the energy source enclosure to flow into the one or more chimney couplings in the vehicle and out of the energy source enclosure while the energy source enclosure is in the designated position. The pack interface device and the pack interface extension may not be aligned such that the one or more second external connectors are not made while the one or more chimney interfaces of the energy source enclosure are not fluidly coupled with the one or more chimney couplings.

The pack interface assembly may include a dielectric body separating the pack interface device from the pack interface extension. The dielectric body may provide a sealed electrically and a mechanically protective interface between the pack interface device and the pack interface extension. The sealed interface may prevent coolant from leaking to the pack interface device. The sealed interface may prevent a thermal event within the energy source enclosure from exiting the energy source enclosure via the pack interface assembly. The dielectric body may be a first dielectric body and the sealed interface provided by the first dielectric body may be a first sealed interface. The pack interface assembly may include a second dielectric body between the pack interface extension and the energy source enclosure. The second dielectric body may provide a second sealed interface to contain one or more of coolant leaks or thermal events to within the energy source enclosure. The second sealed interface may be disposed between the pack interface extension and the energy source enclosure.

Each of the pack interface device and the pack interface extension may be conductively coupled with a ground reference. The pack interface extension may include an outer housing that can maintain coolant within the pack interface extension. The pack interface extension may include an outer housing having one or more drain holes or drain conduits that can direct leaking coolant within the pack interface extension away from the one or more first external connectors.

The energy source enclosure may include an internal control capacitor and internal switches. The internal control capacitor may be charged with electric energy via the one or more second external connectors. The internal switches may control connection of the one or more high voltage energy device cells with the one or more internal control components via an internal connector inside the energy source enclosure.

The one or more internal control components of the energy device back enclosure may be powered by the internal control capacitor for controlling operation of the one or more high voltage energy device cells while the internal switches are open. The one or more high voltage energy device cells may be disconnected from the internal connector.

In another example, another energy device control system is provided. This system may include an energy device rack fixture having one or more chimney couplings and one or more external control interface devices. The one or more chimney couplings may mate with one or more chimney interfaces of one or more energy source enclosures. The one or more external control interface devices may be non-galvanically coupled with the one or more energy source enclosures by one or more first external connectors. The one or more chimney couplings may be fluidly coupled with a chimney conduit that is external to the one or more energy source enclosures to direct exhaust flowing out of the one or more energy source enclosures to the chimney conduit. The one or more external control interface devices may convey communication signals with the one or more energy source enclosures via the one or more first external connectors.

The one or more external control interface devices may be positioned such that the one or more first external connectors are not made while the one or more chimney couplings are not fluidly coupled with the one or more chimney interfaces of the one or more energy source enclosures. The system also may include an energy device monitor controller that can be communicatively coupled with the one or more external control interface devices. The energy device monitor controller may monitor one or more characteristics of the one or more energy source enclosures via the one or more first external connectors between the one or more external control interface devices and the one or more energy devices.

The one or more energy source enclosures may include plural of the energy source enclosures. The energy device monitor controller may select at least one of the energy source enclosures for placement onboard a vehicle based on an estimated or calculated electrical demand of the vehicle for an upcoming trip. The energy device monitor controller may select the at least one of the energy source enclosures based on the one or more characteristics that are monitored. The energy device monitor controller may communicate with the one or more energy source enclosures via the one or more first external control interface devices and monitor an inventory of the one or more energy source enclosures as the one or more characteristics. The energy device monitor controller may communicate with the one or more energy source enclosures via the one or more external control interface devices and monitor a state of health of the one or more energy source enclosures as the one or more characteristics.

The energy device monitor controller may communicate with the one or more energy source enclosures via the one or more external control interface devices and monitor a state of charge of the one or more energy source enclosures as the one or more characteristics. The energy device monitor controller may communicate with the one or more energy source enclosures via the one or more external control interface devices and monitor a temperature of the one or more energy source enclosures as the one or more characteristics.

The one or more external control interface devices may trickle charge one or more energy device cells of the one or more energy devices via the one or more first external connectors. The one or more energy source enclosures may include one or more energy storage devices that can power one or more external loads outside of the one or more energy source enclosures via one or more second external connectors. The one or more first external connectors may be one or more non-conductive connections and the one or more second external connectors may be one or more conductive connections.

As used herein, an element or step recited in the singular and proceeded with the word "a" or "an" do not exclude the plural of said elements or operations, unless such exclusion is explicitly stated. Furthermore, references to "one embodiment" of the invention do not exclude the existence of additional embodiments that incorporate the recited features. Moreover, unless explicitly stated to the contrary, embodiments "comprising," "comprises," "including," "may include," "having," or "has" an element or a plurality of elements having a particular property may include additional such elements not having that property. In the appended claims, the terms "including" and "in which" are used as the plain-English equivalents of the respective terms "comprising" and "wherein." Moreover, in the following claims, the terms "first," "second," and "third," etc. are used merely as labels, and do not impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function devoid of further structure.

The above description is illustrative, and not restrictive. For example, the above-described embodiments (and/or aspects thereof) may be used in combination with each other. In addition, many modifications may be made to adapt a particular situation or material to the teachings of the subject matter without departing from its scope. While the dimensions and types of materials described herein define the parameters of the subject matter, they are exemplary embodiments. Other embodiments will be apparent to one of ordinary skill in the art upon reviewing the above description. The scope of the subject matter should, therefore, be determined with reference to the appended claims, along with the full scope of equivalents to which such claims are entitled.

This written description uses examples to disclose several embodiments of the subject matter, including the best mode, and to enable one of ordinary skill in the art to practice the embodiments of subject matter, including making and using any devices or systems and performing any incorporated methods. The patentable scope of the subject matter is defined by the claims, and may include other examples that occur to one of ordinary skill in the art. Such other examples are intended to be within the scope of the claims if they have structural elements that do not differ from the literal language of the claims, or if they include equivalent structural elements with insubstantial differences from the literal languages of the claims.

What is claimed is:

1. A system comprising:

an energy source enclosure having one or more high voltage energy device cells and one or more internal control components inside the energy source enclosure, the one or more high voltage energy device cells configured to be coupled with one or more loads outside of the energy source enclosure via one or more first external connectors outside of the energy source enclosure; and an external control device that is external to the energy source enclosure and that is configured to be coupled with the energy source enclosure via one or more second external connectors that are external to the energy source enclosure such that the external control device is galvanically isolated from the one or more high voltage energy device cells inside the energy source enclosure, the external control device configured to communicate with the one or more internal control components that are inside the energy source enclosure via the one or more second external connectors to control one or more of charging or discharging of the one or more high voltage energy device cells via the one or more first external connectors.

2. The system of claim 1, wherein the one or more internal control components inside the energy source enclosure are galvanically isolated from the one or more high voltage energy device cells inside the energy source enclosure.

3. The system of claim 1, wherein the one or more loads are high voltage loads, and the one or more high voltage energy device cells inside the energy source enclosure are configured to be connected with one or more low voltage loads that are outside of the energy source enclosure by the one or more second external connectors.

4. The system of claim 3, wherein the one or more low voltage loads include the external control device and the external control device is configured to be powered by the one or more high voltage energy device cells via the one or more second external connectors.

5. The system of claim 1, wherein the one or more second external connectors include one or more of:

a fiber optic cable extending through a dielectric body, a magnetic coupling created by primary and secondary conductive coils separated by a dielectric body, a radio frequency (RF) coupling created by transceiver antennas separated by a dielectric body, a free space optic coupling created by one or more light sources and one or more light detectors, or a capacitive coupling created by a capacitive element disposed between and separating conductive circuits.

6. The system of claim 1, further comprising a pack interface assembly including a pack interface extension and a pack interface device, the pack interface extension affixed to or included within the energy source enclosure and connected with one or more of (a) the internal control components or (b) the one or more high voltage energy device cells that are inside the energy source enclosure, the pack interface device coupled with the pack interface extension by the one or more second external connectors, wherein one or more of:

the pack interface extension includes a vehicle integration control module pack controller configured to communicate with a vehicle controller, the pack interface device configured to direct electric energy into the pack interface extension to power the vehicle integration control module pack controller through the one or more second external connectors between the pack interface device and the pack interface extension, the pack interface device is spaced apart from the pack interface extension by a dielectric body that is external to the energy source enclosure with the one or more second external connectors that are outside of the energy source enclosure extending through or across the dielectric body, the pack interface assembly includes a dielectric body separating the pack interface device from the pack interface extension, the dielectric body providing a sealed electrically and mechanically protective interface between the pack interface device and the pack interface extension, each of the pack interface device and the pack interface extension is conductively coupled with a ground reference, the pack interface extension includes an outer housing configured to maintain coolant within the pack interface extension, or the pack interface extension includes an outer housing having one or more drain holes or drain conduits configured to direct leaking coolant within the pack interface extension away from the one or more first external connectors.

7. The system of claim 1, wherein the energy source enclosure includes an internal control capacitor and internal switches, the internal control capacitor configured to be charged with electric energy via the one or more second external connectors, the internal switches configured to control connection of the one or more high voltage energy device cells with the one or more internal control components via an internal connector inside the energy source enclosure.

8. The system of claim 7, wherein the one or more internal control components of the energy source enclosure are configured to be powered by the internal control capacitor for controlling operation of the one or more high voltage energy device cells while the internal switches are open, and the one or more high voltage energy device cells are disconnected from the internal connector.

9. A system comprising:

an energy device rack fixture having one or more chimney couplings and one or more external control interface devices, the one or more chimney couplings configured to mate with one or more chimney interfaces of one or more energy source enclosures, the one or more external control interface devices configured to be non-galvanically coupled with the one or more energy source enclosures by one or more first external connectors, the one or more chimney couplings fluidly coupled with a chimney conduit that is external to the one or more energy source enclosures to direct exhaust flowing out of the one or more energy source enclosures to the chimney conduit, the one or more external control interface devices configured to convey communication signals with the one or more energy source enclosures via the one or more first external connectors.

10. The system of claim 9, wherein the one or more external control interface devices are positioned such that the one or more first external connectors are not made while the one or more chimney couplings are not fluidly coupled with the one or more chimney interfaces of the one or more energy source enclosures.

11. The system of claim 9, further comprising an energy device monitor controller configured to be communicatively coupled with the one or more external control interface devices, the energy device monitor controller configured to monitor one or more characteristics of the one or more energy source enclosures via the one or more first external connectors between the one or more external control interface devices and the one or more energy devices.

12. The system of claim 11, wherein the one or more energy source enclosures include plural of the energy source enclosures, and the energy device monitor controller is configured to select at least one of the energy source enclosures for placement onboard a vehicle based on an estimated or calculated electrical demand of the vehicle for an upcoming trip, the energy device monitor controller configured to select the at least one of the energy source enclosures based on the one or more characteristics that are monitored.

13. The system of claim 11, wherein the energy device monitor controller is configured to communicate with the one or more energy source enclosures via the one or more external control interface devices and monitor an inventory of the one or more energy source enclosures as the one or more characteristics.

14. The system of claim 11, wherein the energy device monitor controller is configured to communicate with the one or more energy source enclosures via the one or more external control interface devices and monitor one or more of a state of health or a state of charge of the one or more energy source enclosures as the one or more characteristics.

15. The system of claim 11, wherein the energy device monitor controller is configured to communicate with the one or more energy source enclosures via the one or more external control interface devices and monitor a temperature of the one or more energy source enclosures as the one or more characteristics.

16. The system of claim 11, wherein the one or more external control interface devices are configured to trickle charge one or more energy device cells of the one or more energy devices via the one or more first external connectors.

17. The system of claim 9, wherein the one or more energy source enclosures include one or more energy storage devices configured to power one or more external loads outside of the one or more energy source enclosures via one or more second external connectors.

18. The system of claim 17, wherein the one or more first external connectors are one or more non-conductive connections and the one or more second external connectors are one or more conductive connections.

19. A system comprising:

an energy source enclosure having one or more energy device cells and one or more internal control components inside the energy source enclosure, the one or more energy device cells configured to be coupled with one or more loads outside of the energy source enclosure via one or more first external connectors outside of the energy source enclosure; and an external control device that is external to the energy source enclosure and that is configured to be coupled with the energy source enclosure via one or more second external connectors that are external to the energy source enclosure such that the external control device is galvanically isolated from the one or more energy device cells inside the energy source enclosure, the external control device configured to communicate with the one or more internal control components that are inside the energy source enclosure via the one or more second external connectors to control one or more of charging or discharging of the one or more energy device cells via the one or more first external connectors wherein the one or more internal control components inside the energy source enclosure are galvanically isolated from the one or more energy device cells inside the energy source enclosure, wherein the one or more loads are higher voltage loads, and the one or more energy device cells inside the energy source enclosure are configured to be connected with one or more lower voltage loads that are outside of the energy source enclosure by the one or more second external connectors.

20. The system of claim 19, wherein the one or more second external connectors include one or more of:

a fiber optic cable extending through a dielectric body, a magnetic coupling created by primary and secondary conductive coils separated by a dielectric body, a radio frequency (RF) coupling created by transceiver antennas separated by a dielectric body, a free space optic coupling created by one or more light sources and one or more light detectors, or a capacitive coupling created by a capacitive element disposed between and separating conductive circuits.

\* \* \* \* \*